(12) United States Patent
May

(10) Patent No.: US 8,473,400 B1
(45) Date of Patent: Jun. 25, 2013

(54) ELECTRONIC TRADING SYSTEM AND METHOD FOR PRICING TRANSACTIONS TO ACCOUNT FOR RISK

(75) Inventor: Richard Raymond May, London (GB)

(73) Assignee: ICAP Services North America LLC, Jersey City, NJ (US)

( * ) Notice: Subject to any disclaimer, the term of this patent is extended or adjusted under 35 U.S.C. 154(b) by 921 days.

(21) Appl. No.: 11/402,466

(22) Filed: Apr. 12, 2006

(51) Int. Cl.
*G06Q 40/00* (2012.01)

(52) U.S. Cl.
USPC .............................................. 705/37; 705/35

(58) Field of Classification Search
USPC ....................................................... 705/35, 37
See application file for complete search history.

(56) References Cited

U.S. PATENT DOCUMENTS

| | | | | |
|---|---|---|---|---|
| 5,802,499 | A * | 9/1998 | Sampson et al. | 705/35 |
| 7,231,363 | B1 * | 6/2007 | Hughes et al. | 705/37 |
| 7,734,538 | B2 * | 6/2010 | Bauerschmidt et al. | 705/38 |
| 2002/0013758 | A1 * | 1/2002 | Khaitan | 705/37 |
| 2003/0115129 | A1 * | 6/2003 | Feaver et al. | 705/37 |
| 2004/0143525 | A1 * | 7/2004 | Nishimaki | 705/35 |

OTHER PUBLICATIONS

Susan Borkowski. Global Trading of Financial Instruments and Transfer Pricing: A Brief History and Exploratory Study. The International Tax Journal; Fall 2003; 29, 4; ProQuest Central. p. 22.*
Anonymous. MNEs, globalisation and digital economy: Legal and economic aspects. Managerial Law; 2003; 45, 1/2: ProQuest Central. p. 5.*

* cited by examiner

*Primary Examiner* — Muriel Tinkler
(74) *Attorney, Agent, or Firm* — Dickstein Shapiro LLP

(57) ABSTRACT

An electronic trading system and method are described in which credit risk associated with a transaction is captured as a price adjustment on a trade-by-trade basis. In one preferred embodiment, a "request for quote" (RFQ) trading model is presented in which each dealer receiving an RFQ determines a base price as well as an additional credit risk adjustment amount by which the base price should be modified to account for credit risk. In other preferred embodiments, an exchange trading model is presented in which traders submit buy and sell orders whose prices are appropriately adjusted for presentation to each potential counterparty to account for credit risk associated with potential transactions. System designs are also presented to address the technical challenge of permitting each trading participant to apply its own credit risk algorithms and methodologies while avoiding their disclosure to other trading participants.

13 Claims, 26 Drawing Sheets

ELECTRONIC TRADING SYSTEM AND METHOD FOR PRICING TRANSACTIONS TO ACCOUNT FOR RISK

BACKGROUND OF THE INVENTION

In many markets, the risk associated with default by a trader's counterparty is addressed by a broker or other centralized entity that stands behind every transaction and assumes the risk associated with such default. In other markets, however, such as markets for trading interest rate swaps where the potential for default extends long into the future, such an arrangement is not practical. Instead, those markets have developed bi-lateral credit arrangements where each trading entity specifies maximum amounts of credit that it is willing to extend to its potential counterparties. Electronic trading systems that incorporate credit modules to store and apply these credit limits have also been developed and are widely used today.

These systems, however, do not accurately account for the actual risk to a party in executing any given trade but rather seek to limit overall risk to the party through the application of appropriate credit limits. Creating a system that deals with transaction risk on a trade-by-trade basis presents several issues. These include designing an appropriate risk model that will accurately reflect the risk to each trading participant in any given transaction and will furthermore be suitable for implementation in an electronic trading system. Technical problems relating to the design of system architecture and components are also presented since it is desirable for each trading participant to be able to apply its own risk algorithms and methodologies to assess credit risk while avoiding the disclosure of such algorithms and methodologies to other trading participants.

BRIEF SUMMARY OF THE INVENTION

A system and method are described for addressing the issues noted above and providing for the electronic trading of financial instruments (e.g., interest rate swaps) and other items in which the credit risk associated with a transaction is captured as a price adjustment on a trade-by-trade basis. In one preferred embodiment, a "request for quote" (RFQ) trading model is presented in which customers submit requests for price quotes for specified financial instruments. Each dealer receiving an RFQ for a financial instrument determines a base price for the financial instrument as well as an additional credit risk adjustment amount by which the base price subject to normal bid-offer spread should be modified to account for credit risk associated with potential transactions. This modified price is presented to the customer in a response to the RFQ. This is in contrast to the prior art techniques described above in which arbitrary credit lines have been utilized to account for credit risk. These credit models do not account correctly for the inherent credit cost in, for example, an OTC derivative contract between counterparties with differing credit ratings. Rather, in accordance with the present invention, to correctly reflect this credit risk a charge is added to any price based on the market maker's perception of credit risk associated with the transaction. As a result, the price presented to a customer is a function of the customer and the dealer's perception of the credit risk associated with transaction with that customer.

In other preferred embodiments, an exchange trading model is presented in which traders submit buy and sell orders whose prices are appropriately adjusted for presentation to each potential counterparty to account for credit risk associated with potential transactions. System designs are also presented to address the technical challenge of permitting each trading participant to apply its own credit risk algorithms and methodologies to assess credit risk while avoiding the disclosure of such algorithms and methodologies to other trading participants.

DETAILED DESCRIPTION OF THE INVENTION

1. RFQ Model

Figure 1:
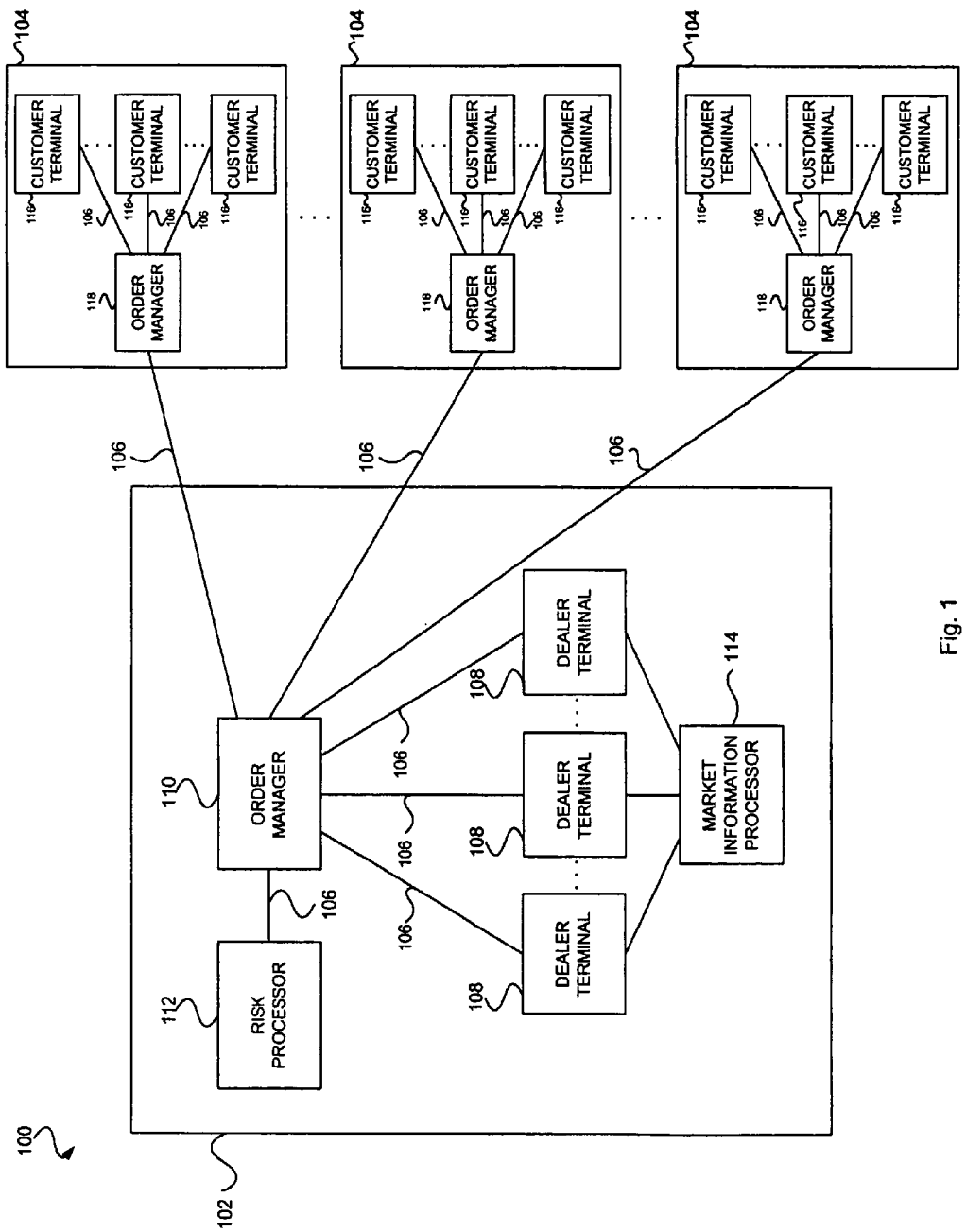
FIG. 1 is a block diagram illustrating aspects of a preferred embodiment for providing RFQ trading.
Figure 2A:
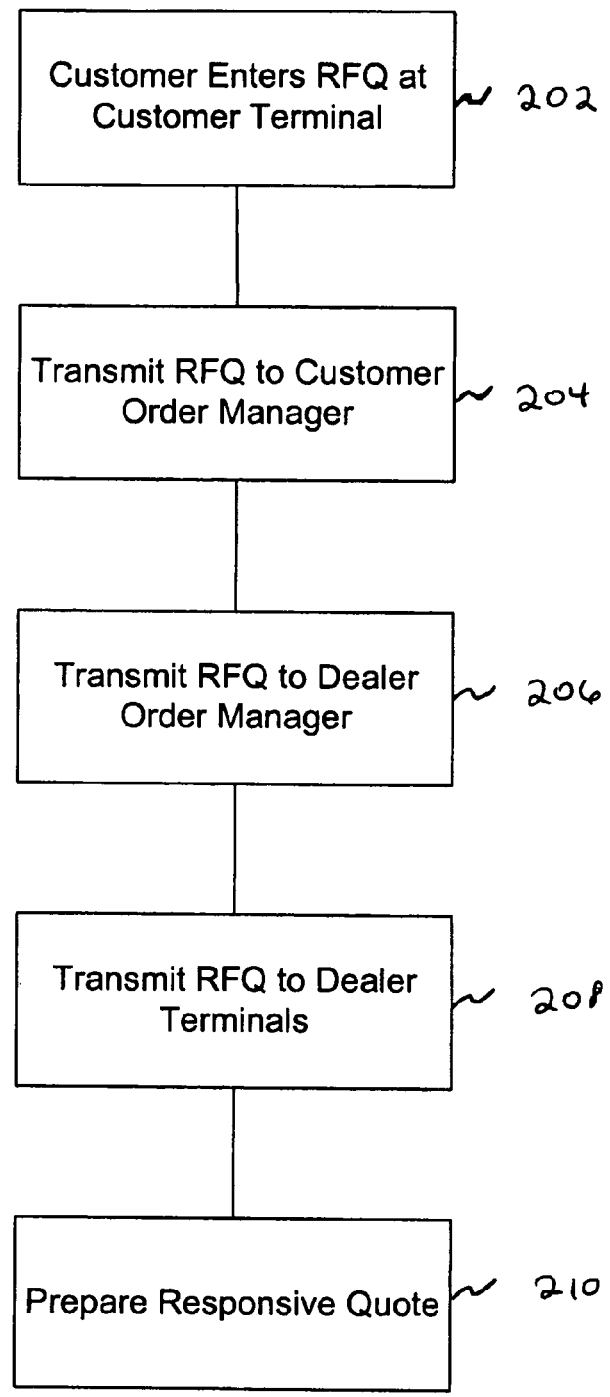
FIGS. 2A-E are flow diagrams illustrating aspects of system operation for conducting RFQ trading in a preferred embodiment.
Figure 2B:
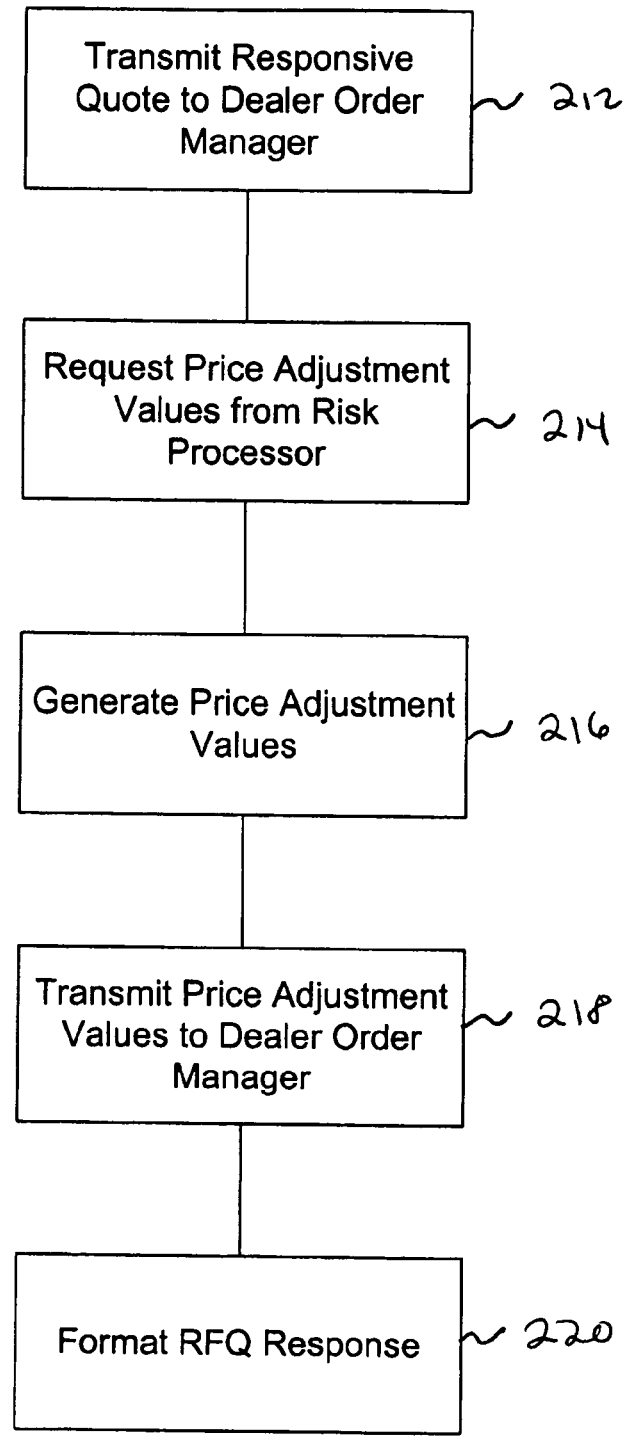
Figure 2C:
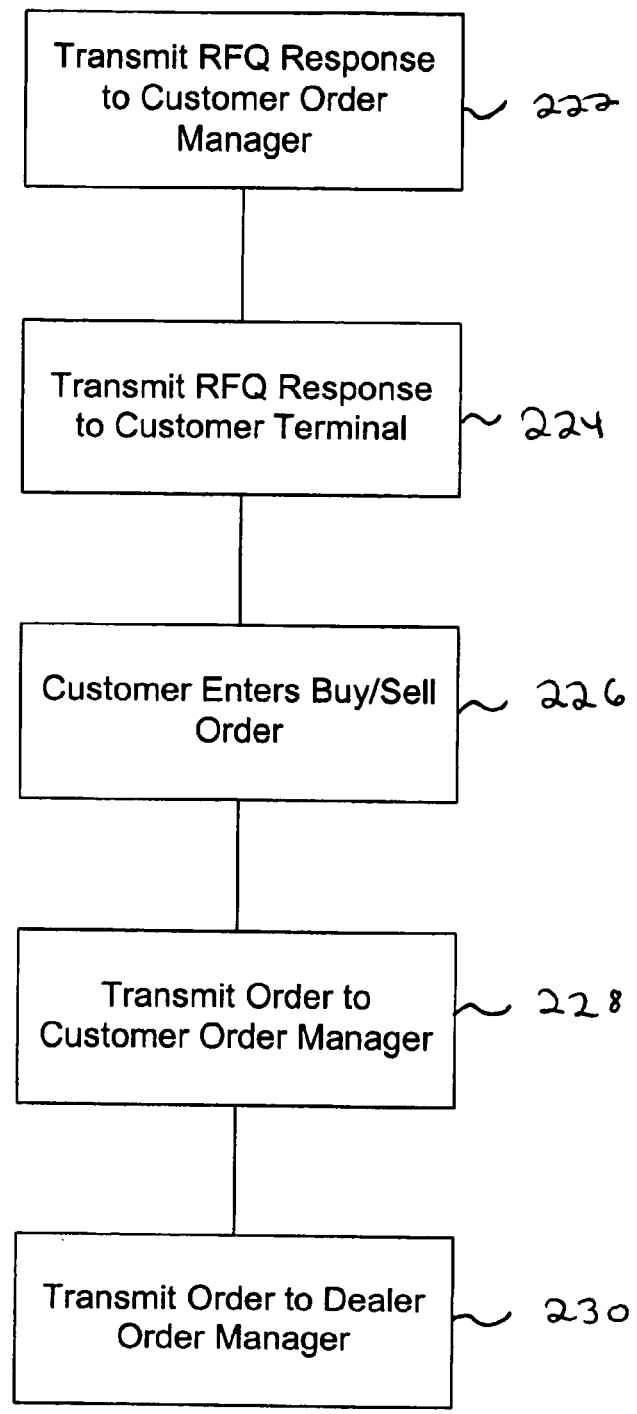
Figure 2D:
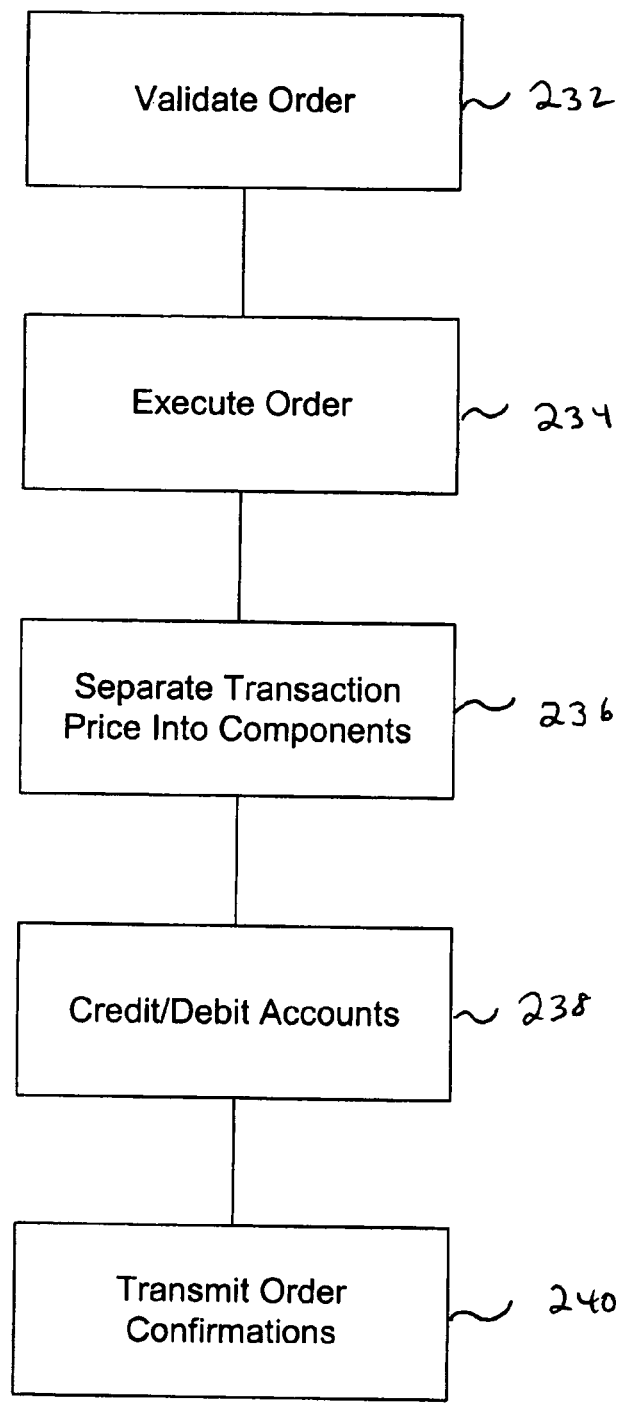
Figure 2E:
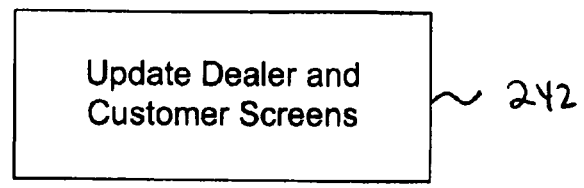

A preferred embodiment for implementing the present invention to provide a "request for quote" (RFQ) trading model is described in connection with FIGS. 1-2. Beginning with FIG. 1, there is shown a system 100 comprising a dealer sub-system 102 and a plurality of customer sub-systems 104 connected via appropriate communication links 106.

Dealer sub-system 102 preferably comprises one or more dealer terminals 108, an order manager 110, a risk processor 112, and a market information processor 114. Each dealer terminal 108 may preferably be a computer workstation comprising a CPU, memory, a display, and input devices, such as a mouse, keyboard, or specialized trading keypad. Terminals 108 are preferably provided to traders employed by the dealer that operates dealer sub-system 102. These traders use terminals 108 to receive and respond to RFQs for specified financial instruments, as described in more detail below. Terminals 108 are also preferably connected to market information processor 114 to facilitate pricing of RFQs by traders working at terminals 108, as described in more detail below.

Order manager 110 preferably comprises one or more server computers adapted to receive and process RFQs, responses to RFQs, and trading orders and confirmations, as described in more detail below. Risk processor 112 preferably comprises one or more server computers adapted to implement the dealer's credit risk analysis methodologies and, more specifically, to generate for each RFQ response, one or more price adjustment values used in generating price quotes to account for credit risk to the dealer associated with transactions that may result from the RFQ response, as described in more detail below. Communication links 106 (and other communication links described throughout the specification) may comprise any appropriate arrangement of wired or wireless communication lines or networks, such as the Internet or dedicated communication lines.

Customer sub-system 104 preferably comprises one or more customer terminals 116 and an order manager 118. Each customer terminal 116 may preferably be a computer workstation comprising a CPU, memory, a display, and input devices, such as a mouse, keyboard, or specialized trading keypad. Terminals 116 are preferably provided to traders employed by the customers that operate customer sub-systems 104. These traders use terminals 116 to create and transmit RFQs, receive responses to RFQs, and to submit buy and sell orders and receive trade confirmations, as described in more detail below. Order manager 118 preferably comprises one or more server computers adapted to receive and process RFQs, responses to RFQs, and trading orders and confirmations from terminals 116 and dealer sub-system 102, as described in more detail below.

A preferred embodiment for conducting RFQ trading utilizing the system architecture shown in FIG. 1 will now be described in connection with FIG. 2. With reference to FIG. 2, in step 202, a trader working at a customer terminal 116 enters an RFQ for a specified financial instrument. In step 204, customer terminal 116 forwards the RFQ to order manager 118 of customer sub-system 104. In step 206, order manager 118 transmits the RFQ to order manager 110 of dealer sub-system 102.

In step 208, order manager 110 transmits the RFQ to the dealer terminals 108 of all dealer employees authorized to and responsible for responding to the RFQ. In step 210, a trader working at a dealer terminal 108 that received the RFQ prepares a responsive price quote. Where the RFQ indicates a request for a quote to buy only or to sell only, the price quote may comprise a single price. Commonly, however, the RFQ may request that the dealer quote prices both to buy and sell a specified financial instrument, in which case the price quote will take the form of a buy/sell spread. Accordingly, for ease of description, the case of an RFQ for a buy/sell spread is primarily described below. Information concerning wholesale market trading in the financial instrument identified in the RFQ, and other related market information relevant to pricing the quote, is preferably fed to dealer terminal 108 from market processor 114 to aid the trader in pricing the quote.

In step 212, dealer terminal 108 forwards the price quote to order manager 110. In step 214, order manager 110 transmits a request to risk processor 112 for one or more price adjustment values to account for any credit risk to the dealer that may result from transacting with the requesting customer. The request preferably comprises all relevant information concerning the RFQ required for any desired credit risk calculations which may, for example, include the financial instrument, the quoted price or price spread, and the customer.

In step 216, risk processor 112 determines an appropriate price adjustment to account for any credit risk associated with potential transactions that may result from the quote. In a preferred embodiment, risk processor 112 may be programmed to apply any desired algorithm specified by the dealer to calculate the price adjustment. These may range from relatively simple algorithms in which price adjustment values are set equal to fixed risk premiums based on the financial instrument, potential counterparty, or price, to more sophisticated proprietary algorithms that may require multiple inputs and complex calculations to determine the credit risk associated with a particular transaction. Typically, the particular credit risk algorithms applied will be established by the dealer's compliance department, and may vary significantly from dealer to dealer. Thus, one benefit of this aspect of the present invention is that it permits each dealer that utilizes the present invention to apply its own credit risk methodologies and algorithms to develop different price quotes for different customers, without disclosure or external examination of its proprietary risk analysis algorithms by outside parties. A preferred embodiment of a price-adjustment algorithm for use by a dealer is described below in Example 1.

In step 218, risk processor 112 forwards the calculated price adjustment values to order manager 110. In step 220, order manager 110 constructs an RFQ response using the price quote from dealer terminal 108 and the price adjustment values from risk processor 112. Specifically, in formatting the RFQ response, order manager 110 calculates a modified price quote by starting with the trader's price quote and modifying the quote to reflect the price adjustments calculated by risk processor 112. Thus, the resulting modified price quote may be viewed as comprising two distinct components: a first component that represents the price quoted by the trader and a second component that represents the price adjustment required by the dealer to account for credit risk associated with any potential transaction that may result from the quote. A preferred embodiment for generating a modified price quote from a trader's price quote and calculated price adjustment values is described below in connection with Example 1.

In step 222, order manager 110 of dealer sub-system 102 transmits the RFQ response (including the modified price quote) to order manager 118 of customer sub-system 104. In step 224, order manager 118 transmits the RFQ response to customer terminal 116 for display to the trader.

The trader considers the RFQ response and determines whether he or she wishes to buy or sell at the quoted prices. If so, in step 226, the trader enters an order to buy or sell a specified quantity of the financial instrument at the quoted price. In step 228, customer terminal 116 transmits the order to order manager 118. In step 230, order manager 118 of customer sub-system 104 transmits the order to order manager 110 of dealer sub-system 102.

In step 232, order manager 110 processes the order to determine if it is valid pursuant to any terms specified in the RFQ response or other contractual documents between the dealer and the customer. For example, if an RFQ response specifies that a price quote is good for 1 minute and the customer's order is received after that time, the order will be rejected by order manager 110.

Otherwise, assuming the order satisfies all requirements, order manager 110 will execute the order. More specifically, in step 234, order manager 110 updates the customer's account to reflect purchase or sale of the quantity of the financial instrument specified in the order. In step 236, order manager 110 separates the transaction price for the asserted order into two components: the component attributable to the price quote specified by the trader and the modifying component included to account for credit risk associated with the transaction. In step 238, order manager 110 credits the risk adjustment portion of the execution price to an internal risk allocation account and performs any other internal accounting necessary to reflect the transaction. A preferred embodiment for crediting a risk allocation account of the dealer in the case of a 10-year interest rate swap is described below in Example 1. In step 240, order manager 110 transmits order confirmations to customer sub-system 102 and dealer terminals 108. In step 242, the screens of both dealer and customer terminals are updated to reflect the executed transaction.

The trading process described above in connection with FIG. 2 will now be illustrated by way of a particular example.

Example 1

For purposes of the present example, it is assumed that a trader employed by a customer enters an RFQ for a buy/sell spread on a semi-bond 10-year interest rate swap. Upon receipt of this RFQ at the dealer, the RFQ is forwarded to a dealer terminal for processing. For purposes of the present example, it will be assumed that the trader responsible for responding to the RFQ quotes a bid/offer spread of: 4.610%-4.630%. This bid/offer spread will typically be generated by modeling software operated by the dealer and adapted to process the current prices of the next 40 Eurodollar futures contracts and other market information to obtain a mid-market price for the 10-year interest swap and then to generate a bid/offer spread around that calculated mid-market price.

The trader's price quote is forwarded to the dealer's order manager, which requests price adjustment values for the price quote from its risk processor. For purposes of the present example, it will be assumed that the risk processor calculates the requested price adjustment values in accordance with the methodology described below.

Figure 9:
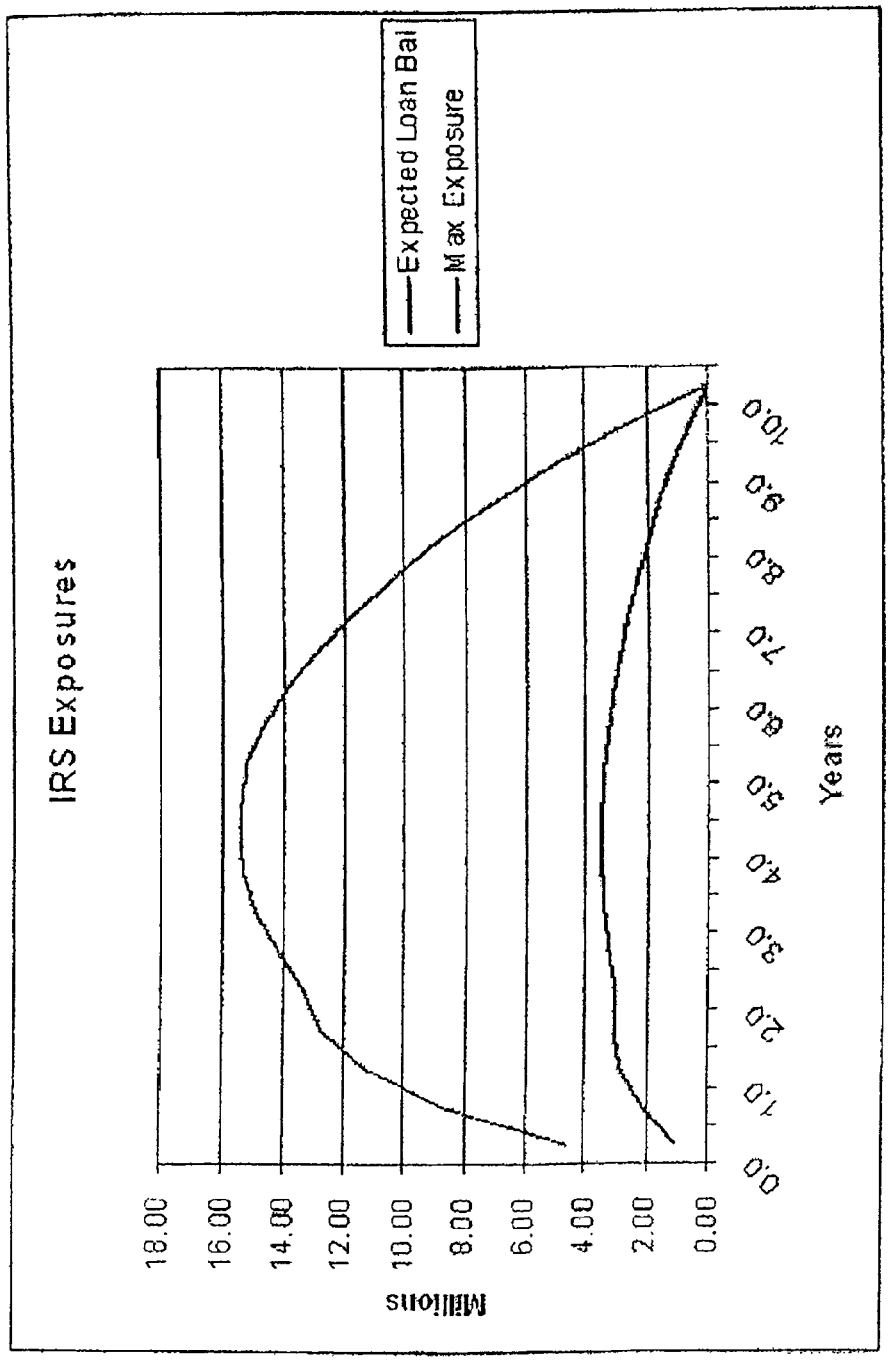
FIG. 9 is a graph illustrating 10 yr. $100 mm Interest Rate Swap paying fixed 4.62 SB.
Figure 10:
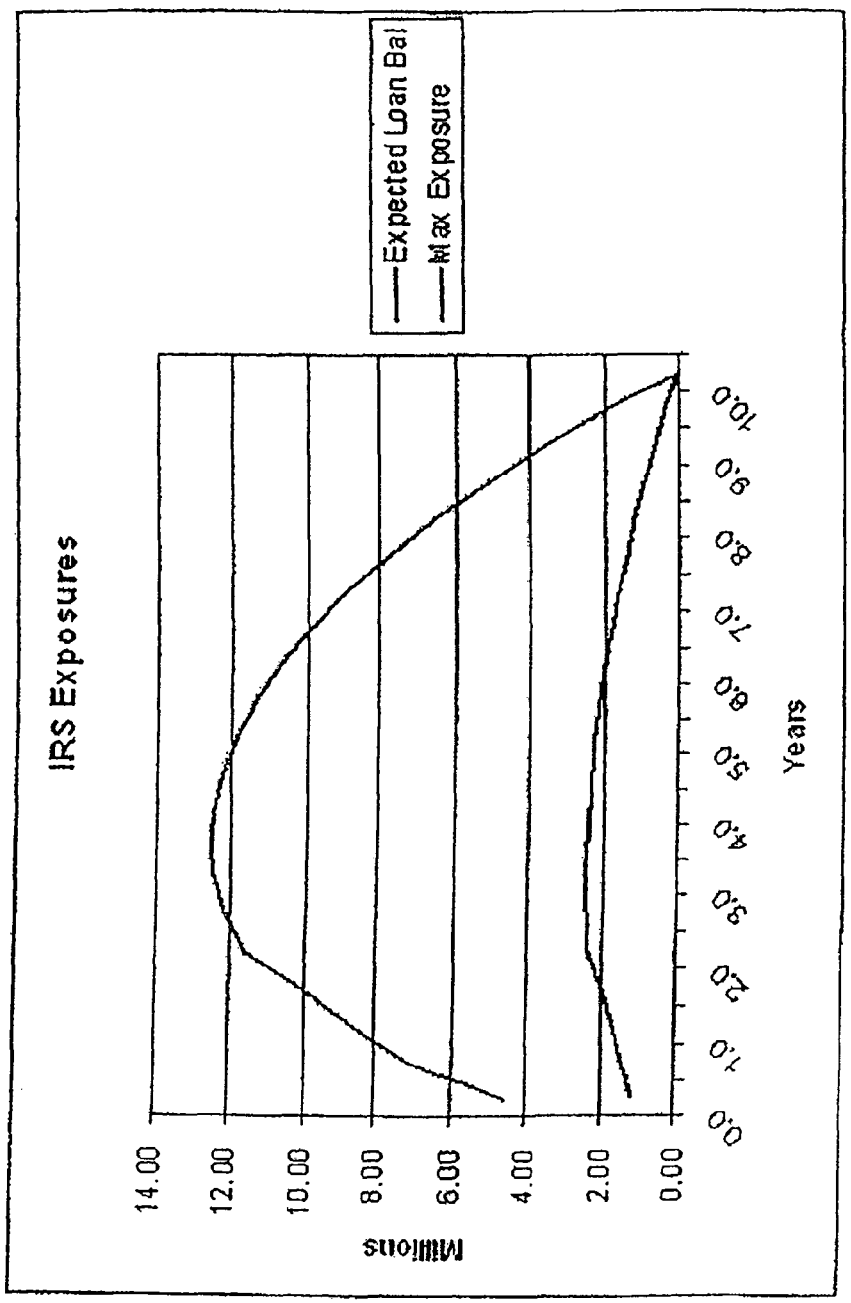
FIG. 10 is a graph illustrating 10 yr. $100 mm Interest Rate Swap receiving fixed 4.62 SB.

As known in the art, an interest rate swap ("IRS") is an OTC derivatives contract where one party pays a fixed interest rate over the term of the swap in return for receiving a floating interest rate, normally based on the London Interbank Offered Rate (LIBOR). A model of the credit exposures to a party paying and receiving the fixed rate over the life of the swap are shown in FIGS. 9 and 10 respectively, assuming the yield curve shown in Table 3 with a volatility of 20% per annum. These exposures are a function of absolute interest rates, the shape of the interest rate yield curve, and the market makers perception of the volatility of interest rates. It should be recognized that the curves shown in FIGS. 9 and 10 are merely exemplary and each dealer may derive its own curves using any desired model and modeling software.

TABLE 3

| | |
|---|---|
| O/N | 3.322% |
| 1-MO | 3.318% |
| 2-MO | 3.313% |
| 3-MO | 3.309% |
| 4-MO | 3.304% |
| 5-MO | 3.300% |
| 6-MO | 3.295% |
| 9-MO | 3.533% |
| 1-YR | 3.697% |
| 2-YR | 4.280% |
| 3-YR | 4.320% |
| 4-YR | 4.350% |
| 5-YR | 4.400% |
| 7-YR | 4.500% |
| 10-YR | 4.620% |
| 30-YR | 4.950% |

FIGS. 9 and 10 show the maximum and average (or expected) exposure at each point in the future over the life of the IRS as defined by a credit-pricing model. These exposures represent the expected value and worst case value of the IRS at future dates based on expected future levels of interest rates. In the examples of FIGS. 9 and 10, the curves show peaks in three and half years, where the market maker entering into the IRS could expect to be owed just under $4 mm on an IRS (the expected value of the IRS at the peak) that for paying fixed and just over $2 mm on an IRS for receiving fixed. From the perspective of the market-maker firm, this may be viewed as the equivalent of making a loan to its counterparty for the amount under the expected value curve at the time the contract is entered into.

In making a loan to a counterparty, it is typical for the lender to charge a spread or premium to the borrower that is a function of the borrower's credit rating. Table 4 sets out an example of a spread-pricing matrix in basis points (100th of one percent) as a function of borrower credit rating and loan maturity. It should be recognized that the values in Table 4 are merely exemplary and each dealer may derive its own values for this table using any desired algorithm.

TABLE 4

| | Maturity | | | | | | | | | |
|---|---|---|---|---|---|---|---|---|---|---|
| Rating | 1 | 2 | 3 | 4 | 5 | 6 | 7 | 8 | 9 | 10 |
| AAA | 5 | 7 | 8 | 9 | 10 | 11 | 12 | 13 | 14 | 15 |
| AA | 15 | 17 | 18 | 19 | 20 | 22 | 24 | 26 | 28 | 30 |
| A | 30 | 35 | 36 | 37 | 38 | 39 | 40 | 42 | 44 | 50 |
| BBB | 45 | 47 | 51 | 53 | 55 | 57 | 59 | 61 | 63 | 65 |
| BB | 135 | 139 | 143 | 147 | 150 | 152 | 154 | 156 | 158 | 160 |
| B | 270 | 275 | 280 | 285 | 290 | 292 | 294 | 296 | 298 | 300 |

Applying the matrix of Table 4 to the expected loan balance of an IRS maturing in 5 and 10 years at assumed volatility rates of 15% and 20%, yields the illustrative price-adjustment values set forth in Table 5, which represent the additional price adjustment values that the market maker should charge to account for credit risk associated with paying and receiving the fixed rate in an IRS for the selected premiums 50, 150, and 300 basis points. Other values may be separately calculated or be interpolated from the table using linear or more sophisticated interpolation.

TABLE 5

| | | Maturity | | | |
|---|---|---|---|---|---|
| | | 10 Year | | 5 Year | |
| | Credit | IRS vol | | | |
| | Srd (bp) | 15.00% | 20.00% | 15.00% | 20.00% |
| Rec Fixed | 300 | 5.40 | 7.56 | 2.00 | 2.86 |
| | 150 | 2.70 | 3.78 | 1.00 | 1.43 |
| | 50 | 0.90 | 1.25 | 0.34 | 0.48 |
| Pay Fixed | 300 | 8.00 | 10.23 | 3.13 | 3.96 |
| | 150 | 4.00 | 5.12 | 1.52 | 1.98 |
| | 50 | 1.34 | 1.70 | 0.52 | 0.66 |

More specifically, the values in Table 5 are preferably determined by (1) integrating the area under the expected loan balance curves in FIGS. 9 and 10, respectively, to determine the size of the risk to the dealer for an IRS in which it pays fixed rate and in which it receives fixed rate, (2) multiplying these amounts by the desired credit premium (e.g., 300 bp) to determine the total amount necessary to account for credit risk associated with such transactions, and (3) spreading this amount over the total $100 m size of the IRS to determine the equivalent number of basis points by which the IRS price must be adjusted to account for the credit risk.

The dealer's order manager constructs an RFQ response including a modified price quote using the trader's price quote and the calculated price adjustment values. For purposes of the present example, it will be assumed that the party that submitted the RFQ has a single A credit rating. Applying the values in Table 5 to the present example, the modified bid quote will be equal to:

$$4.6100\% - 0.0170\% = 4.5930\%$$

More specifically, order manager 110 will subtract the price adjustment value calculated by risk processor 112 from the trader's buy quote to generate the modified buy quote for presentation to the requesting customer. This may be understood conceptually as follows: The initial interest rate specified by the trader in the price quote reflects the total fixed interest rate that the trader will pay to do the swap specified in the RFQ. A portion of that fixed rate, however, will not be paid to the customer, but rather will be withheld by the dealer to account for credit risk associated with any transaction that may result from the quote. That portion is equal to the price adjustment amount. Accordingly, the total fixed rate that the dealer will actually pay to the customer in the event of a transaction is the rate specified by the trader less the price adjustment amount, and the buy quote published to the customer must therefore be reduced by that amount.

Similarly, the modified sell quote will be equal to:

4.6300%+0.0125%=4.6425%

More specifically, the dealer's order manager will add the price adjustment value calculated by its risk processor 112 to the trader's sell quote to generate the modified sell quote for presentation to the requesting customer. This may be understood conceptually as follows: The initial fixed rate specified by the trader in the sell quote reflects the total fixed rate that the trader must receive to sell the financial instrument specified in the RFQ. The rate that the dealer quotes the customer, however, must be higher than the rate specified by the trader to account for credit risk associated with any potential transaction that may result from the quote. This increase in the rate above the rate specified by the trader is equal to the price adjustment amount. Accordingly, the total fixed rate that the dealer must actually receive from the customer to complete a transaction is the rate specified by the trader plus the price adjustment amount, and the offer quote published to the customer must therefore be increased by that amount.

Thus, in the present example, the final buy/sell spread quoted to the customer will be equal to:

| 4.5930% | 4.6425% |
|---|---|

It is assumed further for purposes of the present example that, in response to the above price quote, the customer wishes to sell $10M of the 10-year interest swap at the quoted price of 4.5930%. The customer's order is transmitted to the dealer where it is validated and executed. The price of 4.5930% is then broken into its component parts of 4.6100% specified by the trader and 0.0170% allocated by the dealer to account for credit risk associated with the transaction. In a preferred embodiment, the net present value of the 0.0170% risk-allocation component over the life of the swap is determined and immediately credited to a risk allocation account of the dealer and debited to the trader's account. Thereafter, the size of the fixed-rate leg of the swap each quarter may be determined using the transaction price of 4.5930%, since the entire risk premium for the transaction will have been allocated at the time of execution. Alternatively, the system may be adapted to credit the dealer's risk allocation account on a quarterly basis with the risk allocation portion of the swap's fixed-rate leg, in which case the quarterly fixed-rate leg of the swap is determined based on the 4.6100% rate specified by the trader, of which 4.5930% is set off against the customer's floating rate obligation for the quarter and 0.0170% is allocated to the dealer's risk allocation account.

In a preferred embodiment, each dealer may complete a matrix that specifies the credit-rating or "rating band" to which the dealer wishes to assign each potential counterparty. If desired, the matrix may also comprise a column for specifying whether the dealer is willing to transact with the counterparty on any terms. An illustrative matrix completed by a dealer DCF is shown below:

TABLE 6

| Counterparty | Rating Band | Trade | Maturity |
|---|---|---|---|
| XYZ | 6 | Yes | All |
| ABC | 3 | Yes | All |
| GHT | 0 | Yes | Up to 5 yr |

In a preferred embodiment, seven rating bands are defined. The first rating band (band=0) is preferably used by dealers to specify potential counterparties as to whom a price adjustment of zero should be subtracted or added from bids/offers quoted to the potential counterparty. The remaining rating bands 1-6 may preferably correspond to credit ratings AAA through B, respectively. Matrixes for specifying the price adjustment values for the different rating bands, such as the illustrative matrixes shown below, may then be determined.

TABLE 7

IRS Pay
Fixed Credit Spread Grid

| | Maturity | | |
|---|---|---|---|
| | 1 | 5 | 10 |
| 0 | 0.00 | 0.00 | 0.00 |
| 1 | 0.01 | 0.13 | 0.51 |
| 2 | 0.03 | 0.26 | 1.02 |
| 3 | 0.04 | 0.45 | 1.70 |
| 4 | 0.09 | 0.71 | 2.21 |
| 5 | 0.26 | 1.95 | 5.44 |
| 6 | 0.53 | 3.77 | 10.2 |

TABLE 8

IRS Receive
Fixed Credit Spread Grid

| | Maturity | | |
|---|---|---|---|
| | 1 | 5 | 10 |
| 0 | 0.00 | 0.00 | 0.00 |
| 1 | 0.01 | 0.10 | 0.38 |
| 2 | 0.02 | 0.19 | 0.76 |
| 3 | 0.02 | 0.34 | 1.25 |
| 4 | 0.05 | 0.53 | 1.64 |
| 5 | 0.14 | 1.45 | 4.04 |
| 6 | 0.28 | 2.80 | 7.58 |

In this preferred embodiment, when a dealer receives an RFQ from a customer, the dealer preferably determines the customer's rating band from the customer matrix and uses the rating band to look up the price adjustment value for the quote being prepared in the appropriate pay or receive credit spread grid.

It should be recognized that although the above preferred embodiment and example have been described in connection with a single dealer fielding RFQs from multiple customers, the system may be adapted to support multiple dealers such that customer RFQs are concurrently transmitted to multiple dealers, and customers may receive competitive price quotes from two or more of the multiple dealers in response to their RFQs.

2. Exchange Trading Model

Figure 3:
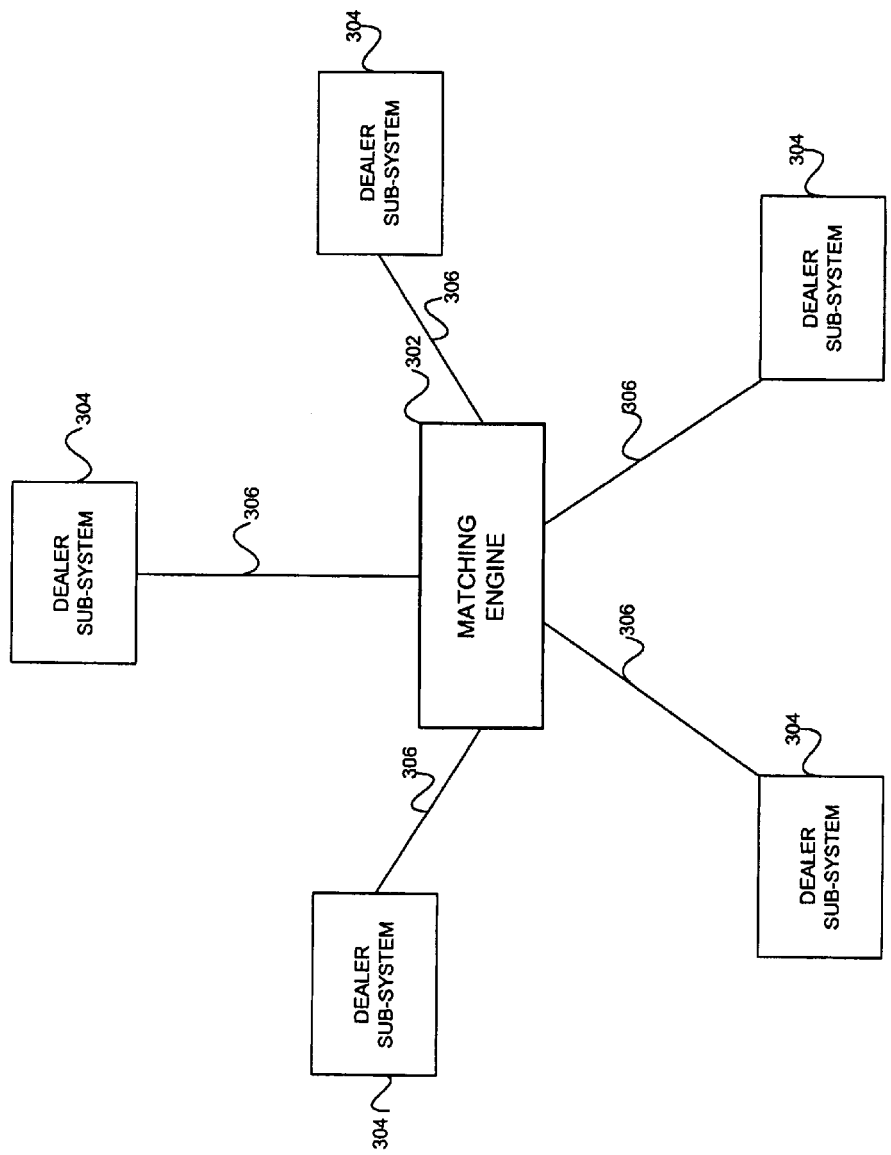
FIG. 3 is a block diagram illustrating aspects of a preferred embodiment for providing RFQ trading.

A preferred embodiment for implementing the present invention to provide an exchange trading model is described in connection with FIGS. 3-5. With reference to FIG. 3, there is shown a system 300 comprising a matching engine 302 and a plurality of dealer sub-systems 304 connected via communication links 306. Matching engine 302 preferably comprises one or more server computers adapted to receive orders to buy and sell financial instruments from dealer sub-systems 304, to process trading orders in accordance with specified protocols, and to communicate market information concerning trading activity to dealer sub-systems 304, as described in more detail below.

Figure 4:
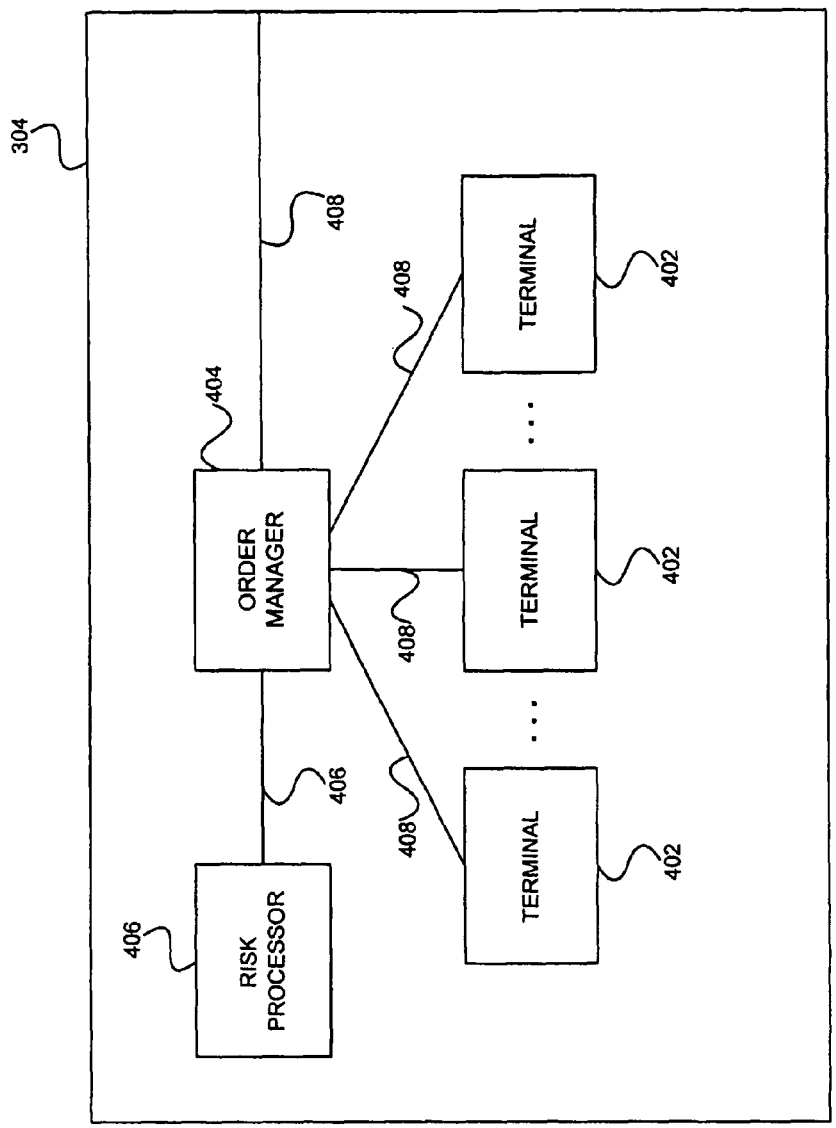
FIG. 4 is a block diagram illustrating a preferred embodiment for implementing a dealer subsystem.
Figure 5A:
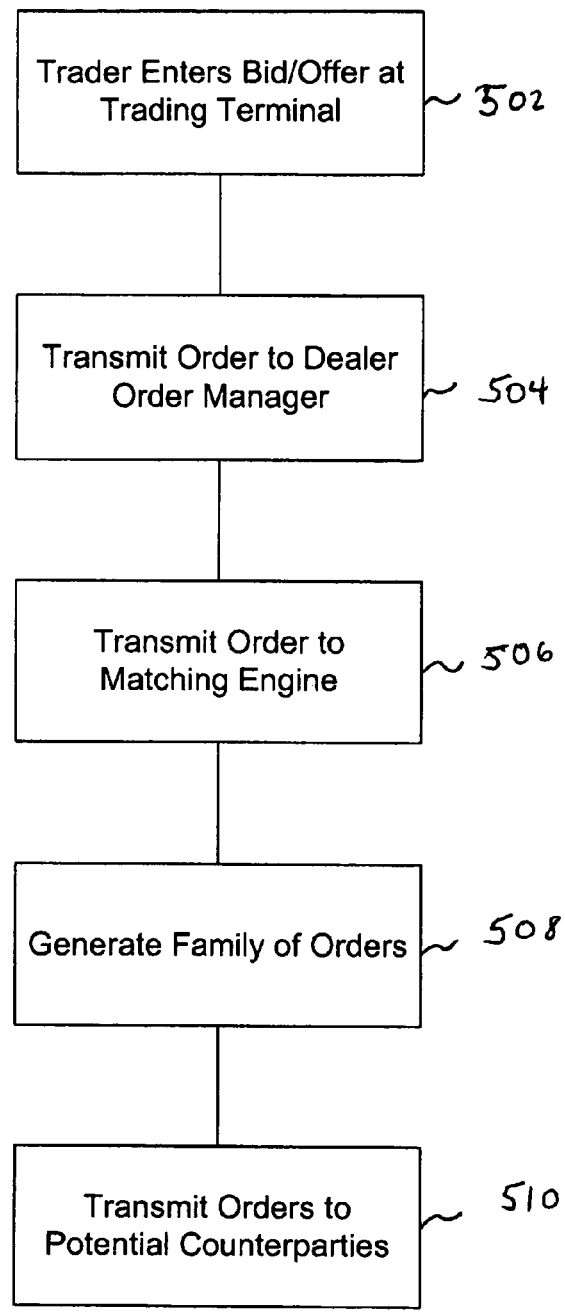
FIGS. 5A-D are flow diagrams illustrating aspects of system operation for conducting exchange trading in one preferred embodiment.
Figure 5B:
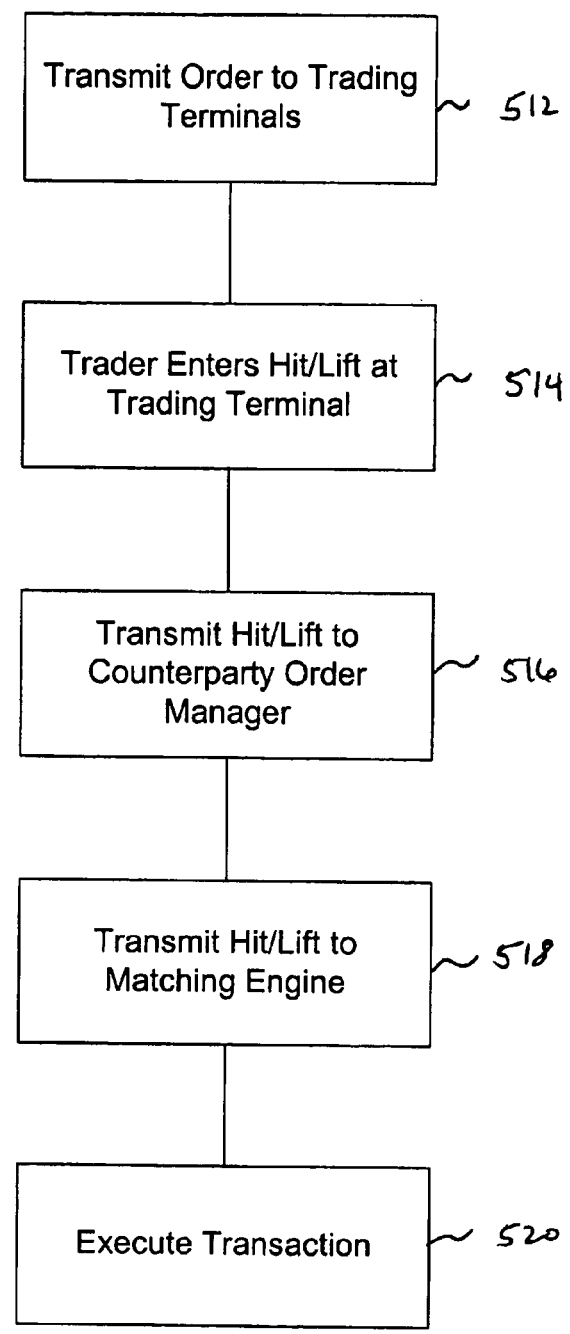
Figure 5C:
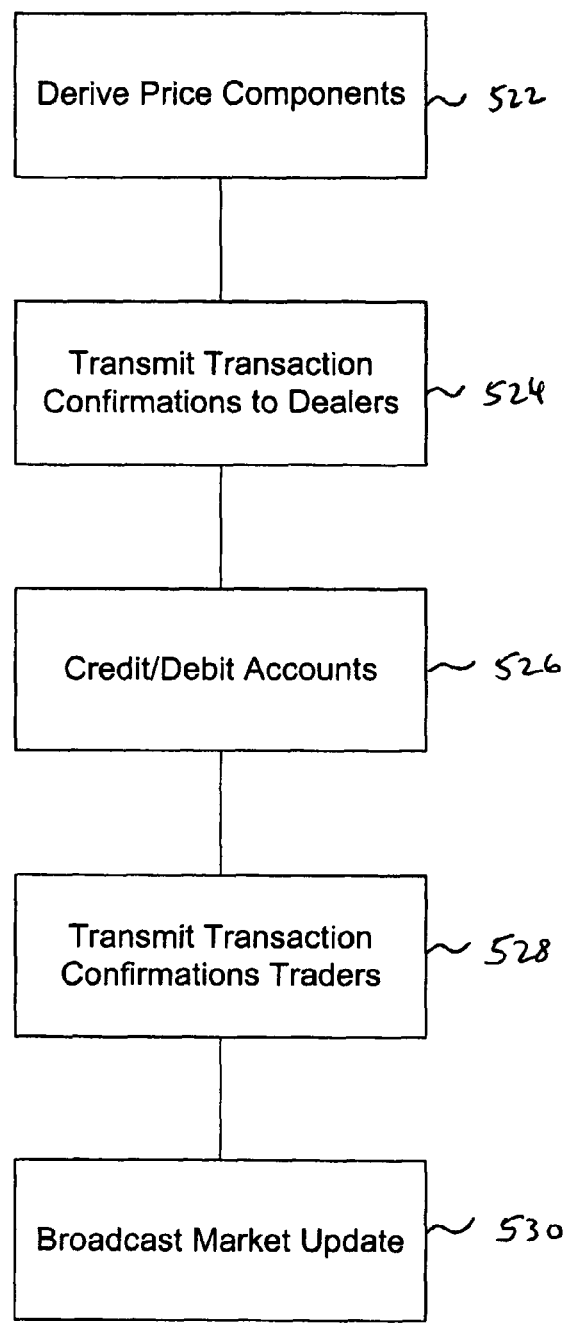
Figure 5D:
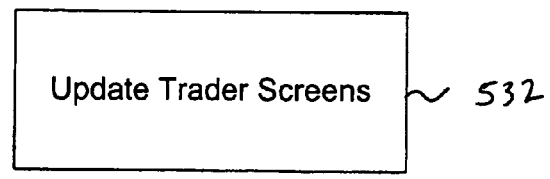

With reference to FIG. 4, each dealer sub-system 304 preferably comprises one or more trading terminals 402, an order manager 404, and a risk processor 406, connected via communication links 408. Each trading terminal 402 may preferably be a computer workstation comprising a CPU, memory, a display, and input devices, such as a mouse, keyboard, or specialized trading keypad. Terminals 402 are preferably provided to traders employed by dealers and used by those traders to enter buy and sell orders and to display market and transaction-confirmation information, as described in more detail below.

Order manager 404 preferably comprises one or more server computers adapted to receive and process buy and sell orders from trading terminals 402 and transaction confirmations and market information from matching engine 302, as described in more detail below. Risk processor 406 preferably comprises one or more server computers adapted to periodically generate an array of price adjustment quantities for each financial instrument traded via matching engine 302, and to transmit the array to matching engine 302 via order manager 404. Each price adjustment quantity in the array represents a price premium required by the dealer that operates risk processor 406 to account for credit risk associated with transacting in the specified instrument with a particular counterparty. Risk processor 406 preferably generates the price adjustment quantities by executing one or more predetermined risk calculation algorithms programmed in computer software running on risk processor 406. The array preferably comprises entries by dealer, instrument, and maturity for each of the buy and sell sides of the market (pay and receive in the case of IRSs).

Risk processor 406 may be programmed to apply any desired algorithm or algorithms to calculate the price adjustment values, such as the algorithm described above in connection with the RFQ trading model. In addition, where appropriate, risk processor 406 may be programmed to run such algorithms at any desired periodicity (e.g., every 10 minutes or each time there is a shift in market price for the instrument greater than some predetermined amount). As above, such algorithms may range from relatively simple ones in which the price adjustment values are set equal to fixed risk premiums based on transaction type and/or potential counterparty, to more sophisticated proprietary algorithms for calculating the credit risk associated with a particular transaction. Risk processor 406 may further be programmed to generate and transmit price adjustment arrays to matching engine 302 at any periodicity desired by the dealer. Thus, one benefit of this aspect of the present invention is that it permits each dealer to apply its own risk calculation algorithms to develop different order prices for presentation to different potential counterparties without requiring the dealer to disclose the algorithms by which it calculates those prices to any other entity including the entity that operates matching engine 302, and thus to maintain the confidentiality of its proprietary risk-calculation algorithms. Generation of a price adjustment array will now be illustrated by way of a particular example.

Example 2

This example illustrates how a dealer, Dealer A, might implement the above-described preferred embodiment to generate a price adjustment array. For purposes of the present example, it will be assumed that Dealer A has specified the following risk processing rule for determining price adjustment values with respect to a specified instrument:

If Dealer A has a bilateral credit agreement with a specified potential counterparty Then price adjustment with respect to that potential counterparty=0 Else price adjustment with respect to that potential counterparty=the change in the interest rate summed over the life of the swap such that its present value is equal to the expected loss in the event potential counterparty fails to deliver Assuming this risk processing algorithm, risk processor 406 of Dealer A would determine, for each potential counterparty (e.g., Dealers B-E), whether Dealer A has signed a bilateral credit agreement with the potential counterparty. As to any potential counterparty with which it has such an agreement, it will set the price adjustment value for that potential counterparty to zero. As to any other potential counterparty, it will determine the change in the interest rate summed over the life of the swap such that its present value is equal to the average expected loss to the dealer that would result from failure to deliver by the potential counterparty. This quantity may, for example, be calculated as discussed above in connection with Example 1 or using any desired proprietary algorithm of the dealer and may, for example, take as input the current market price for the instrument and average price fluctuations for an expected period over the life of the contract predicted by the dealer's proprietary risk modeling algorithms.

For purposes of the present example, it will be assumed that Dealer A has an executed bilateral credit agreement with Dealer D, but not Dealer B, Dealer C, or Dealer E, and that the average expected loss for non-delivery by a counterparty with respect to a particular instrument is 0.002% running, i.e., per annum on the notional ("principal"). For ease of description, it will be further assumed for purposes of this illustrative example that this amount is the same for both buying and selling. In that case, the price adjustment array generated by Dealer A for that instrument will be:

| Potential Counterparty | Price Adjustment |
|---|---|
| Dealer B | 0.002 |
| Dealer C | 0.002 |
| Dealer D | 0.000 |
| Dealer E | 0.002 |

Each of Dealers B-E will similarly generate price adjustment arrays according to their own proprietary algorithms and transmit these to matching engine 302 for use in adjusting order prices, as described in more detail below.

A preferred embodiment for conducting exchange trading utilizing the system architecture shown in FIGS. 3-4 will now be described in connection with FIG. 5. Referring to FIG. 5, in step 502, a trader working at a trading terminal 402 of a dealer sub-system 304 enters a bid or offer to buy or sell a specified financial instrument at a specified price. For ease of description, this will be referred to as a base order.

In step 504, the base order is forwarded by terminal 402 to order manager 404. In step 506, order manager 404 transmits the base order to matching engine 302. For ease of description, the dealer that submitted the order to matching engine 302 will be referred to as the submitting party.

In step 508, matching engine 302 uses the price adjustment arrays received from the dealers to generate a family of orders from the entered order, wherein each order in the family is specifically targeted to a potential counterparty and the price of each order is adjusted by the price adjustment quantities specified in the appropriate entry of the price adjustment arrays associated with the submitting party and the potential counterparty. For ease of description, these orders will be referred to as price-adjusted orders. A particular example illustrating a preferred embodiment for carrying out step 508 is described below in Example 3.

In step 510, matching engine 302 determines, for each price-adjusted order in the family of orders, the potential counterparty to which the order relates and transmits the order to the order manager of that counterparty. The following steps will preferably be performed at each potential counterparty sub-system that receives an order. For ease of discussion, however, the steps will be described with reference to one such sub-system.

Upon receipt of the price-adjusted order by order manager 404 of the potential counterparty, in step 512, the order manager transmits the order to terminals 402 for display to the potential counterparty's traders. In some embodiments, each trader may have the option of seeing pricing for the price-adjusted order broken into two components, the transaction price (equal to the price of the base order as adjusted by the submitting party's risk adjustment) and the credit risk adjustment applied by the trader's risk processor.

In step 514, a counterparty trader determines that he or she wishes to execute against the displayed price-adjusted order and enters a command to do so (e.g., a hit or a lift command). In step 516, this hit or lift command is transmitted to the counterparty's order manager 404. In step 518, order manager 404 transmits the hit or lift command to matching engine 302.

In step 520, matching engine 302 executes the transaction. In step 522, matching engine 302 derives three price components for the transaction. One component constitutes the price adjustment specified by the submitting party, a second component constitutes the price adjustment specified by the hitting or lifting dealer, and a third component constitutes the original price specified by the submitting dealer's trader in the base order. Illustrative examples for deriving these pricing components in the case of a hit or lift are described below in Example 3.

In step 524, matching engine 302 transmits confirmation messages to both transacting parties. In a preferred embodiment, the confirmation message transmitted to the entity that originally submitted the bid or offer includes the first and third of the three price components determined in step 522. By contrast, the confirmation message transmitted to the hitting or lifting entity preferably includes the second of these three components and a composite price component comprised of the third component as modified by the first price adjustment value. A particular example illustrating implementation of step 524 is described below in Example 3 along with a conceptual explanation for why matching engine 302 parses and distributes pricing information in this way. In step 526, order managers 404 of the transacting dealers credit their respective risk adjustment portions of the execution price to respective internal risk allocation accounts and perform any other internal accounting necessary to reflect the transaction. A preferred embodiment for crediting a risk allocation account at each transacting dealer in the case of a 2-year interest rate swap is described below in Example 3.

In step 528, order managers 404 of the transacting dealers transmit transaction confirmation messages to the trader terminals 402 of the transacting traders. In step 530, matching engine 302 broadcasts a market update message to all market participants to inform the market of the transaction. In step 532, the screens of all traders are updated to reflect the new state of the market resulting from the trade execution.

Operation of this preferred embodiment of the present invention will now be further described in connection with a particular example.

Example 3

For purposes of the present example, it will be assumed that a trader at a first dealer, Dealer A, enters a base bid for 10M at 4.970%. This order is transmitted to matching engine 302 by order manager 404 of Dealer A.

It will be assumed further that the current price adjustment arrays of Dealers A-E previously submitted to matching engine 302 (see Example 2 above) are as follows:

| Potential Counterparty | Price Adjustment Value |
|---|---|
| Dealer A | |
| Dealer B | 0.002 |
| Dealer C | 0.002 |
| Dealer D | 0.000 |
| Dealer E | 0.002 |
| Dealer B | |
| Dealer A | 0.001 |
| Dealer C | 0.002 |
| Dealer D | 0.001 |
| Dealer E | 0.003 |
| Dealer C | |
| Dealer A | 0.002 |
| Dealer B | 0.001 |
| Dealer D | 0.003 |
| Dealer E | 0.000 |
| Dealer D | |
| Dealer A | 0.000 |
| Dealer B | 0.001 |
| Dealer C | 0.002 |
| Dealer E | 0.002 |
| Dealer E | |
| Dealer A | 0.003 |
| Dealer B | 0.002 |
| Dealer C | 0.000 |
| Dealer D | 0.002 |

Matching engine 302 generates a family of related orders based on the order submitted by Dealer A by creating a modified price-adjusted order for each potential counterparty (Dealers B-E) whose price is adjusted based on the relevant entries in the price adjustment arrays of Dealer A and the potential counterparty. More specifically, to generate the modified price for a given counterparty, matching engine 302 first subtracts from the submitted order price the price adjustment value specified in Dealer A's array for the potential counterparty, and then further subtracts the price adjustment value specified in the potential counterparty's array for Dealer A. Thus, for example, the modified price calculated for presentation to Dealer B, in the present example, will be equal to:

4.970%−0.002%−0.001%=4.967%

This may be understood conceptually as follows: The interest rate of the base bid entered by the trader at Dealer A reflects the fixed rate that the trader is willing to pay to do the swap specified in the bid. If and when the trader's bid is hit by another dealer, however, a portion of that interest rate will not be paid to the counterparty, but rather will be withheld by Dealer A to account for any credit risk to Dealer A associated with execution of the transaction. That portion is equal to the price adjustment amount specified by Dealer A for transacting with the counterparty dealer. Accordingly, the total fixed rate that will actually be paid by Dealer A to its counterparty is less than the rate specified in the trader's base bid by that price adjustment amount. Similarly, if and when a trader at Dealer B hits Dealer A's bid, some portion of the fixed rate that Dealer A will pay to Dealer B will be allocated by Dealer B to account for credit risk to Dealer B associated with execution of the transaction. That portion is equal to the price adjustment amount specified by Dealer B for transacting with Dealer A. Accordingly, the total rate specified in the modified order transmitted by matching engine 302 for display to Dealer B's traders must be further reduced to account for this second price adjustment amount. In other words, from the counterparty trader's perspective, the total rate the counterparty trader will receive if it hits the bid from Dealer A is equal to the price specified by Dealer A's trader less the price adjustment amounts required by Dealer A and Dealer B to account for credit risk associated with the transaction.

Applying the above to each potential counterparty for the bid (Dealers B-E), it will be seen that, in the present example, matching engine 302 preferably generates a family of four modified orders as follows:

| Potential Counterparty | Order Type | Quantity | Price |
|---|---|---|---|
| Dealer B | Bid | 10 | 4.967 |
| Dealer C | Bid | 10 | 4.966 |
| Dealer D | Bid | 10 | 4.970 |
| Dealer E | Bid | 10 | 4.965 |

At this point in the present example, the screens of Dealers A-E would appear as follows:

| Bid | | Offer | |
|---|---|---|---|
| Quantity | Price | Price | Quantity |
| Dealer A Screen | | | |
| 10 | 4.970* | | |
| *Indicates own bid. | | | |
| Dealer B Screen | | | |
| 10 | 4.967 | | |
| Dealer C Screen | | | |
| 10 | 4.966 | | |
| Dealer D Screen | | | |
| 10 | 4.970 | | |
| Dealer E Screen | | | |
| 10 | 4.965 | | |

For purposes of the present example, it will now be further assumed that a trader at Dealer B enters a base offer to sell 20M at 5.030%. This base order is transmitted to matching engine 302 by order manager 404 of Dealer B. For ease of description, it will be assumed further that the current price adjustment arrays of Dealers A-E previously submitted to matching engine 302 for processing offers at the time of Dealer B's submission are the same as those shown above in connection with the processing of Dealer A's bid.

Matching engine 302 generates a family of related orders based on the order submitted by Dealer B by creating a modified price-adjusted order for each potential counterparty (Dealer A and Dealers C-E) whose price is adjusted based on the relevant entries in the price adjustment arrays of Dealer B and the potential counterparty. More specifically, to generate the modified price for a given counterparty, matching engine 302 first adds the submitted order price to the price adjustment value specified in Dealer B's array for the potential counterparty, and then further adds the price adjustment value specified in the potential counterparty's array for Dealer B. Thus, for example, the modified price calculated for presentation to Dealer A, in the present example, will be equal to:

5.030%+0.001%+0.002%=5.033%

This may be understood conceptually as follows: The fixed rate entered by the trader at Dealer B reflects the total fixed rate that the trader wishes to receive to do the swap specified in the offer. If and when the trader's offer is lifted by another dealer, however, a portion of the total fixed rate received by Dealer B will be allocated by Dealer B to account for any credit risk to Dealer B associated with execution of the transaction. That portion is equal to the price adjustment amount specified by Dealer B for transacting with the other dealer. Accordingly, the total rate that must actually be received by Dealer B from its counterparty is more than the rate specified by the trader by that price adjustment amount. Similarly, if and when a trader at Dealer A lifts Dealer B's offer, Dealer A will allocate a portion of the fixed rate that it pays to Dealer B to account for credit risk to Dealer A associated with execution of the transaction. That portion is determined by the price adjustment amount specified by Dealer A for transacting with Dealer B. Accordingly, the total fixed rate specified in the modified order transmitted by matching engine 302 for display to Dealer A's traders must be further increased to account for this second price adjustment amount. In other words, from the counterparty trader's perspective, the total fixed rate the counterparty trader will pay if it lifts the offer from Dealer B is equal to the rate specified by Dealer B's trader plus the price adjustment amounts required by Dealer B and Dealer A to account for credit risk associated with the transaction.

Applying the above calculations to each potential counterparty for the offer (Dealer A and Dealers C-E), it will be seen that, in the present example, matching engine 302 preferably generates a family of four modified orders as follows:

| Potential Counterparty | Order Type | Quantity | Price |
|---|---|---|---|
| Dealer A | Offer | 20 | 5.033 |
| Dealer C | Offer | 20 | 5.033 |
| Dealer D | Offer | 20 | 5.032 |
| Dealer E | Offer | 20 | 5.035 |

At this point in the present example, the screens of Dealers A-E would appear as follows:

| Bid | | Offer | |
|---|---|---|---|
| Quantity | Price | Price | Quantity |
| *Dealer A Screen* | | | |
| 10 | 4.970* | 5.033 | 20 |
| *Indicates own bid.* | | | |
| *Dealer B Screen* | | | |
| 10 | 4.967 | 5.030* | 20 |
| *Indicates own offer.* | | | |
| *Dealer C Screen* | | | |
| 10 | 4.966 | 5.033 | 20 |
| *Dealer D Screen* | | | |
| 10 | 4.970 | 5.032 | 20 |
| *Dealer E Screen* | | | |
| 10 | 4.965 | 5.035 | 20 |

As those skilled in the art will recognize, although for purposes of illustration the above example describes processing of one bid and one offer for a relatively small number of dealers, the above example may be scaled to include more market participants and repeated for additional orders resulting in further population of traders' screens with bids and offers at various prices and quantities.

Continuing with the present example, it will be assumed further that a trader at Dealer C sees the price-adjusted bid priced at 4.966 on his or her screen and hits the bid. The hit command is transmitted by order manager 404 of Dealer C to matching engine 302. Matching engine 302 executes the transaction and transmits confirmation messages concerning the transaction to both transacting dealers. As noted above, these confirmation messages preferably comprise distinct pricing information. Specifically, in the present example, matching engine will parse the pricing information relating to the transaction into three components:

Component 1=price adjustment value specified by Dealer A for transacting with Dealer C (0.002)

Component 2=price adjustment value specified in the base order by Dealer C for transacting with Dealer A (0.002)

Component 3=original order price specified in the base order by trader at Dealer A (4.970)

The confirmation message to Dealer A preferably comprises Component 1 and Component 3 above. This information is enough for Dealer A to determine: (a) the total price paid by Dealer A to Dealer C to purchase the instrument (equal to Component 3–Component 1), and (b) the portion of that price that should be allocated to credit risk associated with the transaction (Component 1), without revealing to Dealer A any information concerning Dealer C's credit risk profile for Dealer A. Similarly, the confirmation message to Dealer C preferably comprises component 2 and a calculated component (Component 3') equal to the difference between Component 3 and Component 1. This information is enough for Dealer C to determine: (a) the total price it will receive from Dealer A for selling the instrument (Component 3'+Component 2); and (b) the portion of that price that should be allocated to credit risk associated with the transaction (Component 2), without revealing to Dealer C any information concerning Dealer A's risk profile for Dealer C.

In a preferred embodiment, each dealer calculates the net present value of the risk-allocation portion of the fixed rate over the life of the swap and immediately credits that amount to its respective risk allocation account and debits the account of its respective trader in this amount. Thereafter, the size of the fixed-rate leg of the swap each quarter may be determined using the transaction price of the swap (i.e., 4.968%) since the entire credit risk premium for the transaction will have been allocated at the time of execution. Alternatively, one or both of the dealer risk allocation accounts may be credited on a quarterly basis in an amount equal to the portion of the swap's fixed rate leg ascribable to the dealer's respective price adjustment amount, in which case the size of the fixed rate leg of the swap is determined for the dealer's trader based on the fixed rate specified in the base bid (in the case of the passive trader) or the hit (in the case of the aggressive trader).

Continuing with the present example, it will be assumed further that a trader at Dealer D sees the price-adjusted offer priced at 5.032 on his or her screen and lifts the offer. The lift command is transmitted by order manager 404 of Dealer D to matching engine 302. Matching engine 302 executes the transaction and transmits confirmation messages concerning the transaction to both transacting dealers. As noted above, these confirmation messages preferably comprise distinct pricing information. Specifically, in the present example, matching engine will parse the pricing information relating to the transaction into three components:

Component 1=price adjustment value specified by Dealer B for transacting with Dealer D (0.001)

Component 2=price adjustment value specified in the base order by Dealer D for transacting with Dealer B (0.001)

Component 3=original order price specified in the base order by trader at Dealer B (5.030)

The confirmation message to Dealer B preferably comprises Component 1 and Component 3 above. This information is enough for Dealer B to determine: (a) the total price it will receive from Dealer D for selling the instrument (equal to Component 3+Component 1), and (b) the portion of that price that should be allocated to credit risk associated with the transaction (Component 1), without revealing to Dealer B any information concerning Dealer D's credit risk profile for Dealer B. Similarly, the confirmation message to Dealer D preferably comprises component 2 and a calculated component (Component 3") equal to the sum of Component 3 and Component 1. This information is enough for Dealer D to determine: (a) the total price paid by Dealer D to Dealer B to purchase the instrument (Component 3"+Component 2); and (b) the portion of that price that should be allocated to credit risk associated with the transaction (Component 2), without revealing to Dealer D any information concerning Dealer B's credit risk profile for Dealer D.

In a preferred embodiment, each dealer calculates the net present value of the risk-allocation portion of the fixed rate over the life of the swap and immediately credits that amount to its respective risk allocation account and debits the account of its respective trader in this amount. Thereafter, the size of the fixed-rate leg of the swap each quarter may be determined using the transaction price of the swap (i.e., 5.031%) since the entire credit risk premium for the transaction will have been allocated at the time of execution. Alternatively, one or both of the dealer risk allocation accounts may be credited on a quarterly basis in an amount equal to the portion of the swap's fixed rate leg ascribable to the dealer's respective price adjustment amount, in which case the size of the fixed rate leg of the swap is determined for the dealer's trader based on the fixed rate specified in the base offer (in the case of the passive trader) or the lift (in the case of the aggressive trader).

In a preferred embodiment, one or both of the traders participating in the transaction may be charged a commission by the entity that operates matching engine 302. If desired, this commission may be included in the bid and offer prices displayed to the submitting and/or potential counterparty traders so that the displayed prices represent the total price to be paid/received by a trader including any commission.

As those skilled in the art will recognize, although the preferred embodiment described above exhibits many desirable features, it will typically require periodic updates of potentially voluminous price adjustment information from dealer sub-systems 304 to matching engine 302. In some circumstances, however, it may be preferable to avoid such updates by transmitting a received order to all potential counterparties for direct price adjustment processing by the counterparty. But this alternative may present its own difficulties particularly where disclosure of the entity that submitted the order is required or helpful in calculating price adjustment values, since multi-lateral trading systems typically operate on an anonymous basis. Accordingly, alternative preferred embodiments of the present invention may be provided that do not call for such periodic updates and yet preserve the anonymity of trading participants, as described below.

More specifically, another preferred embodiment for implementing the present invention to provide an exchange trading model will now be described in connection with FIG. 3 and FIGS. 6-7. This preferred embodiment may preferably utilize largely the same architecture and components shown in FIG. 3; however, as will be understood from the following description and examples, the design and operation of those components will differ to some degree in this preferred embodiment.

Figure 6:
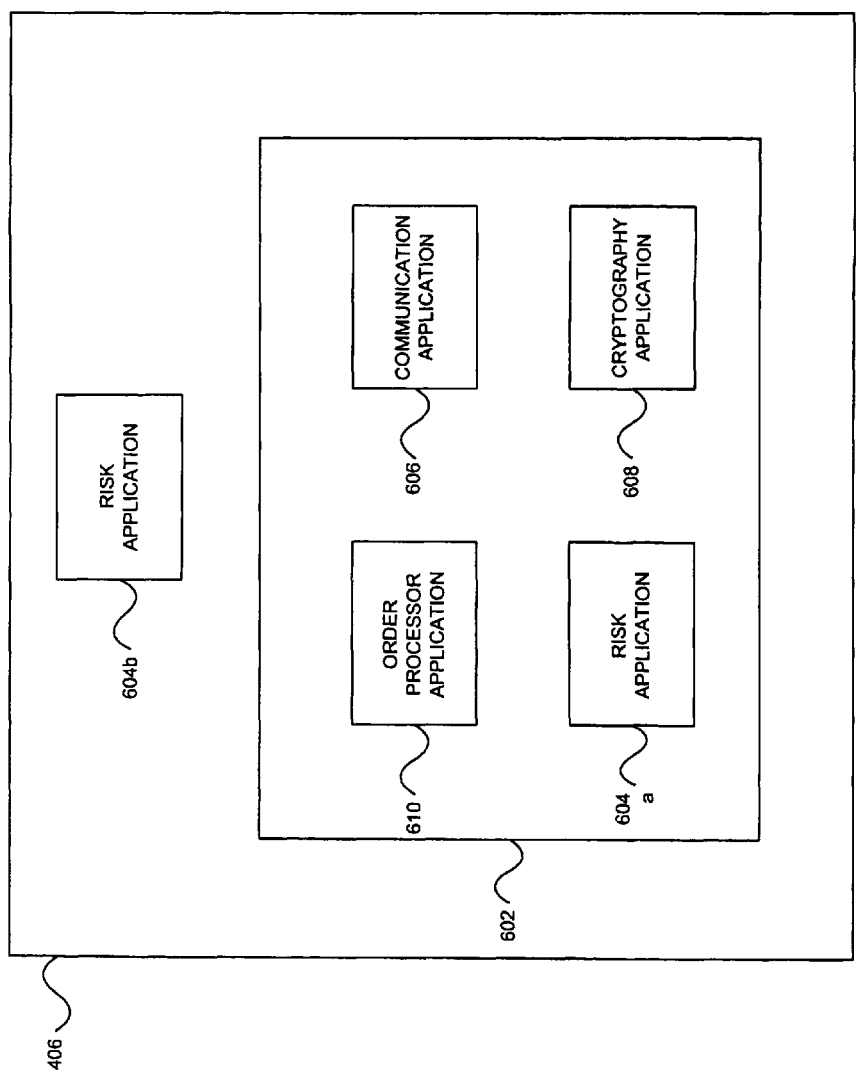
FIG. 6 is a block diagram illustrating a preferred embodiment for implementing a risk processor.
Figure 7A:
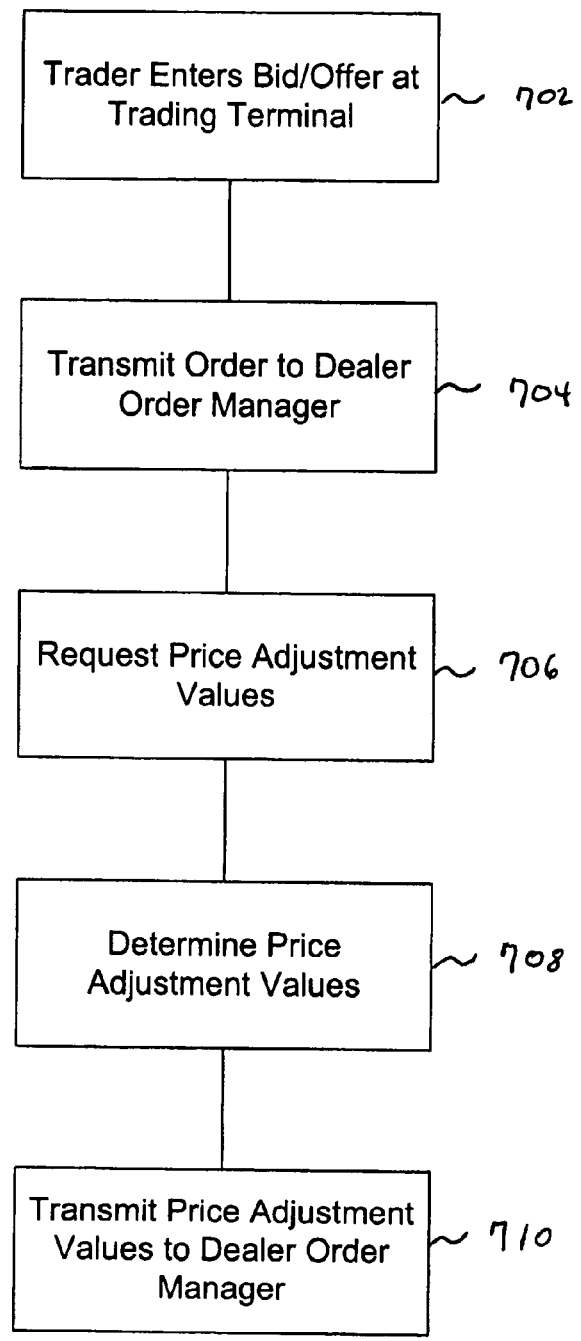
FIGS. 7A-F are flow diagrams illustrating aspects of system operation for conducting exchange trading in a second preferred embodiment.
Figure 7B:
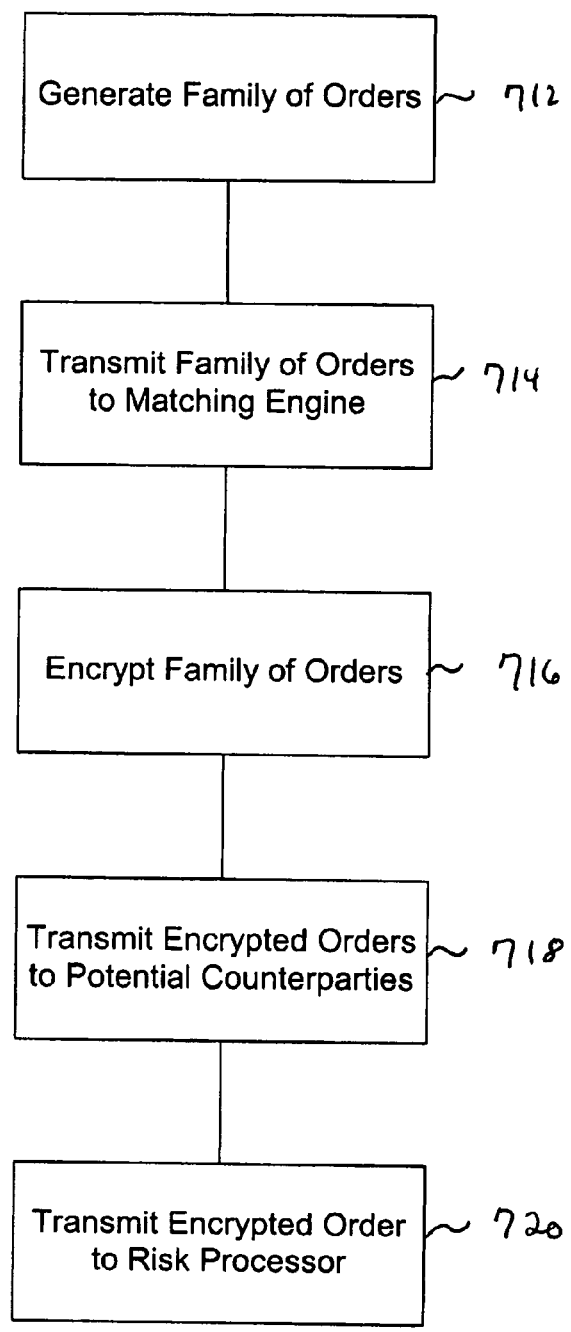
Figure 7C:
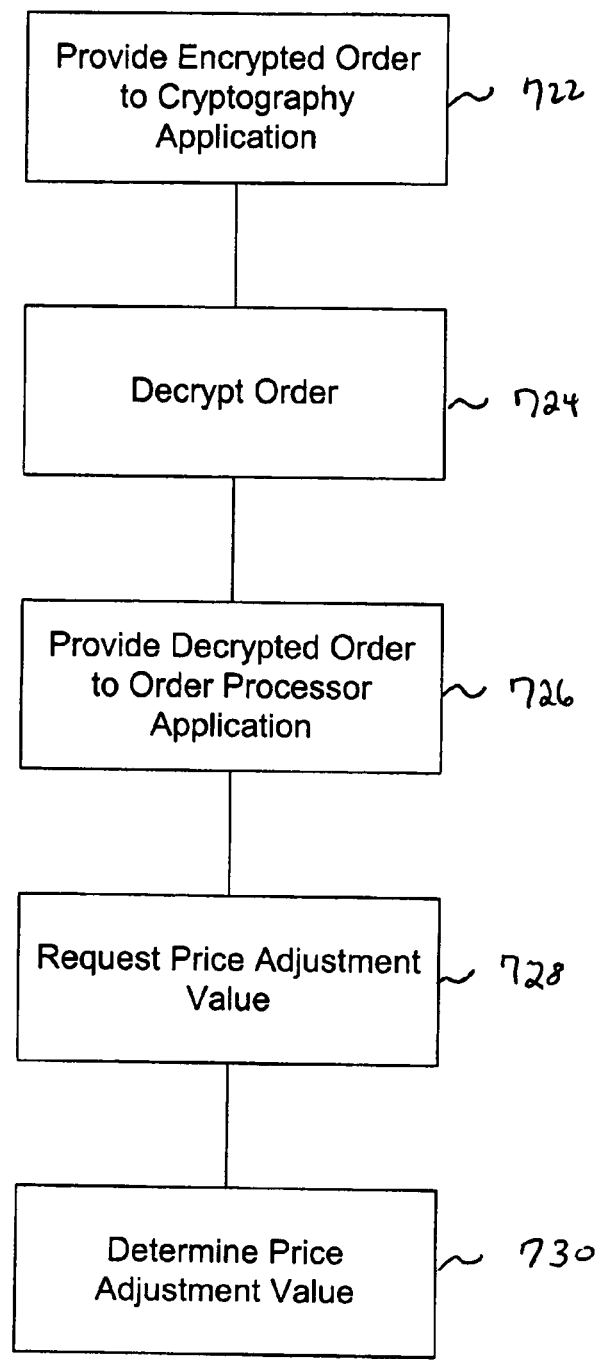
Figure 7D:
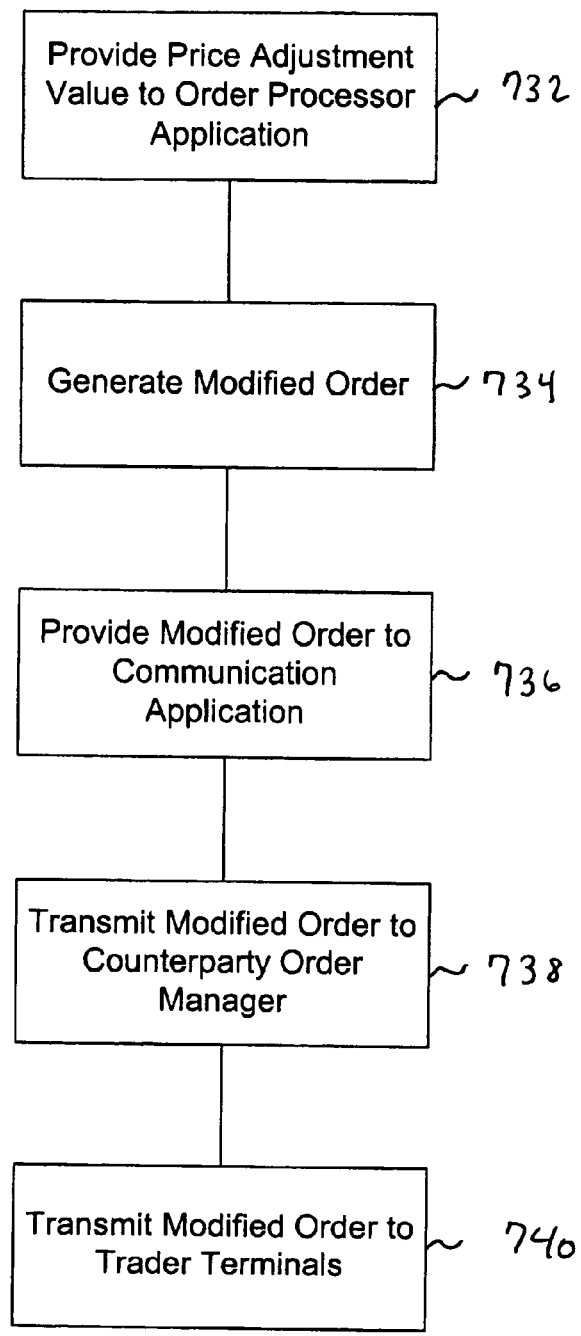
Figure 7E:
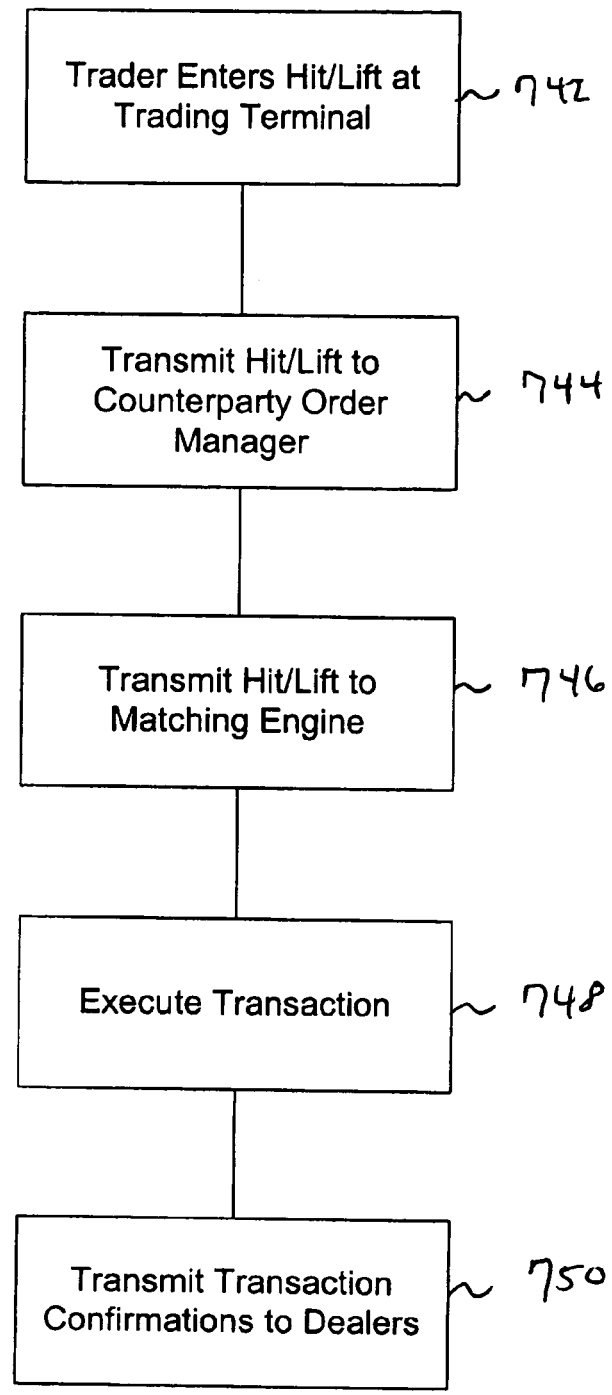
Figure 7F:
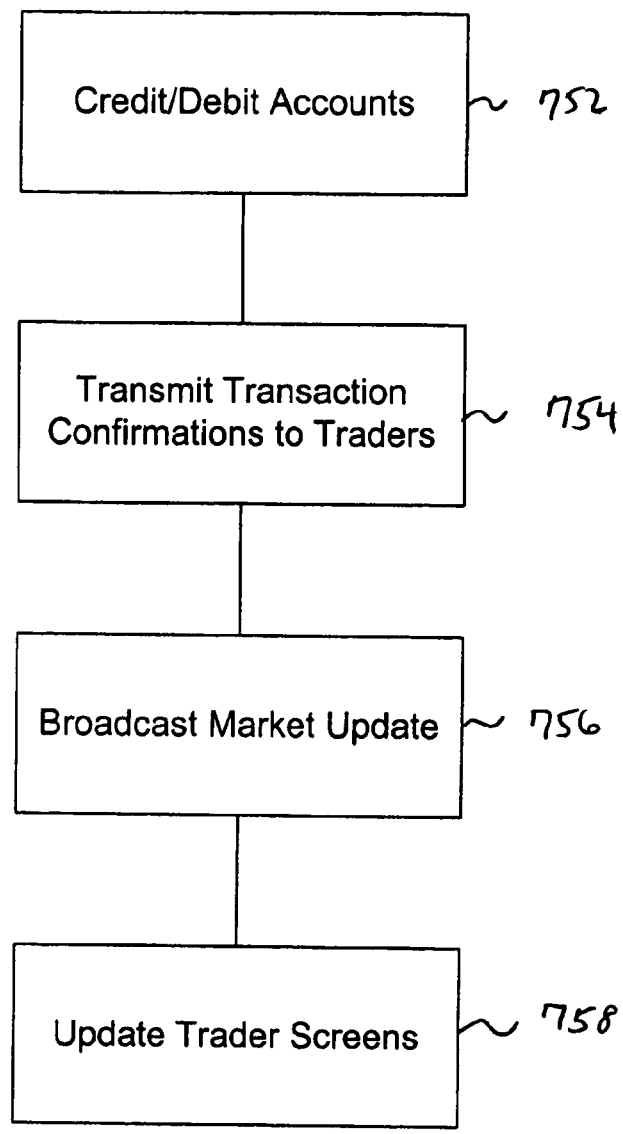
Figure 8A:
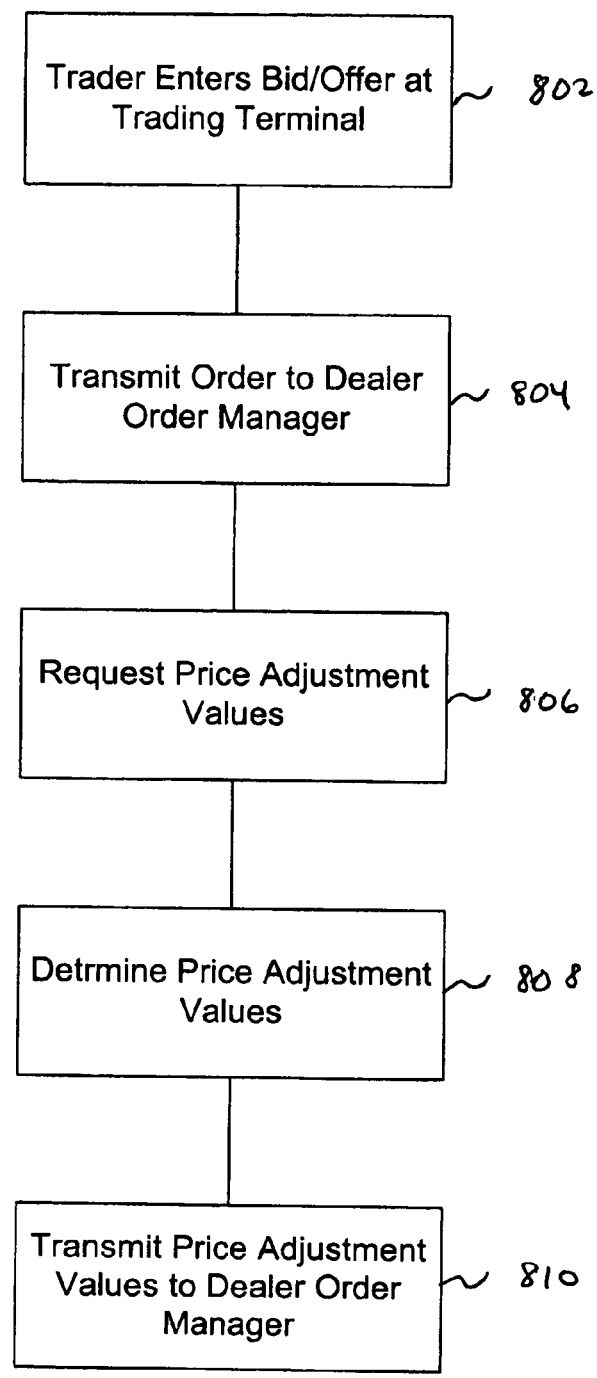
FIGS. 8A-E are flow diagrams illustrating aspects of system operation for conducting exchange trading in a third preferred embodiment.
Figure 8B:
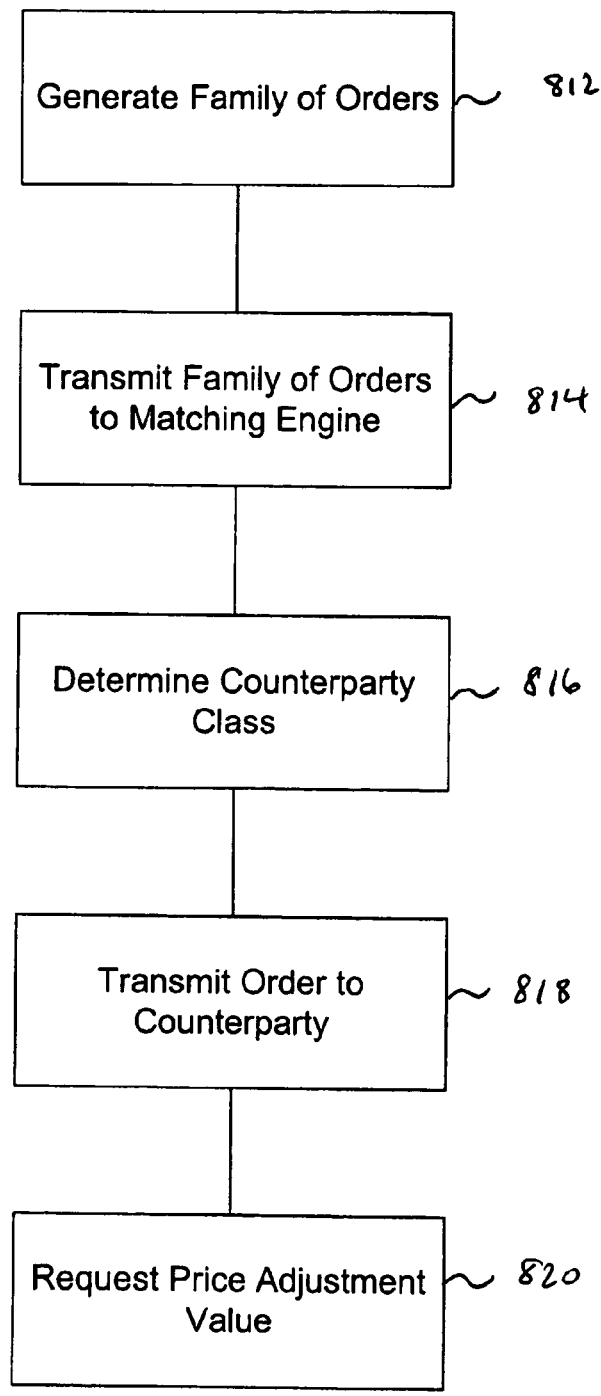
Figure 8C:
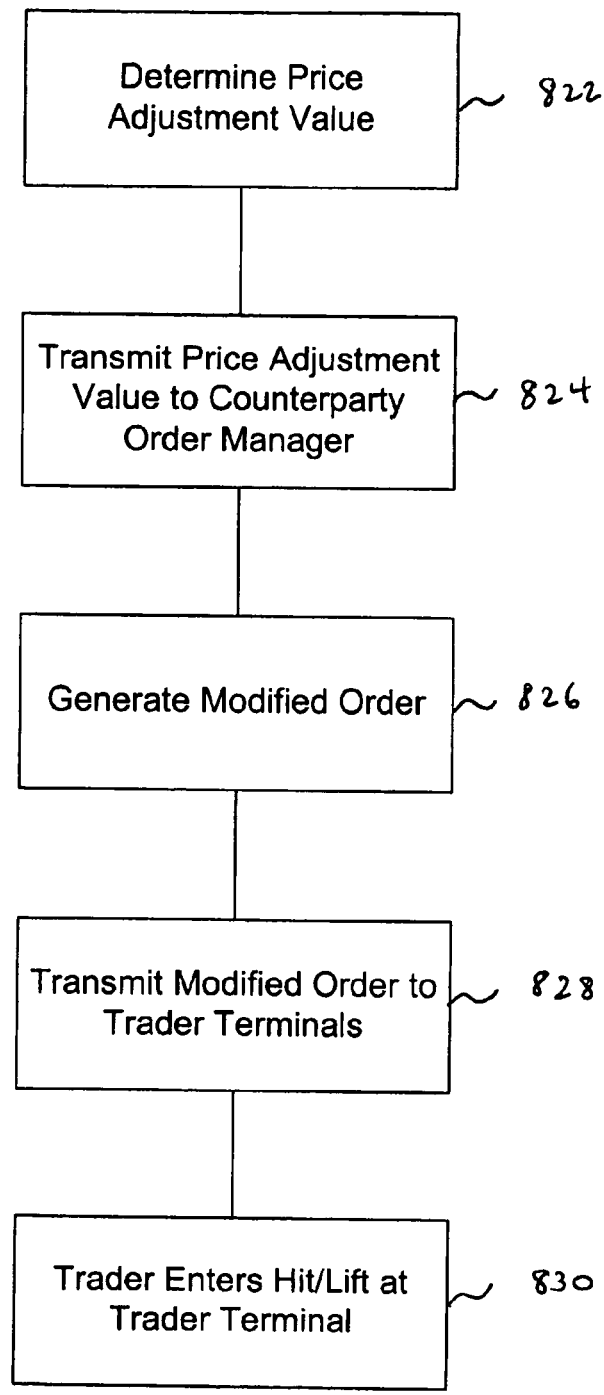
Figure 8D:
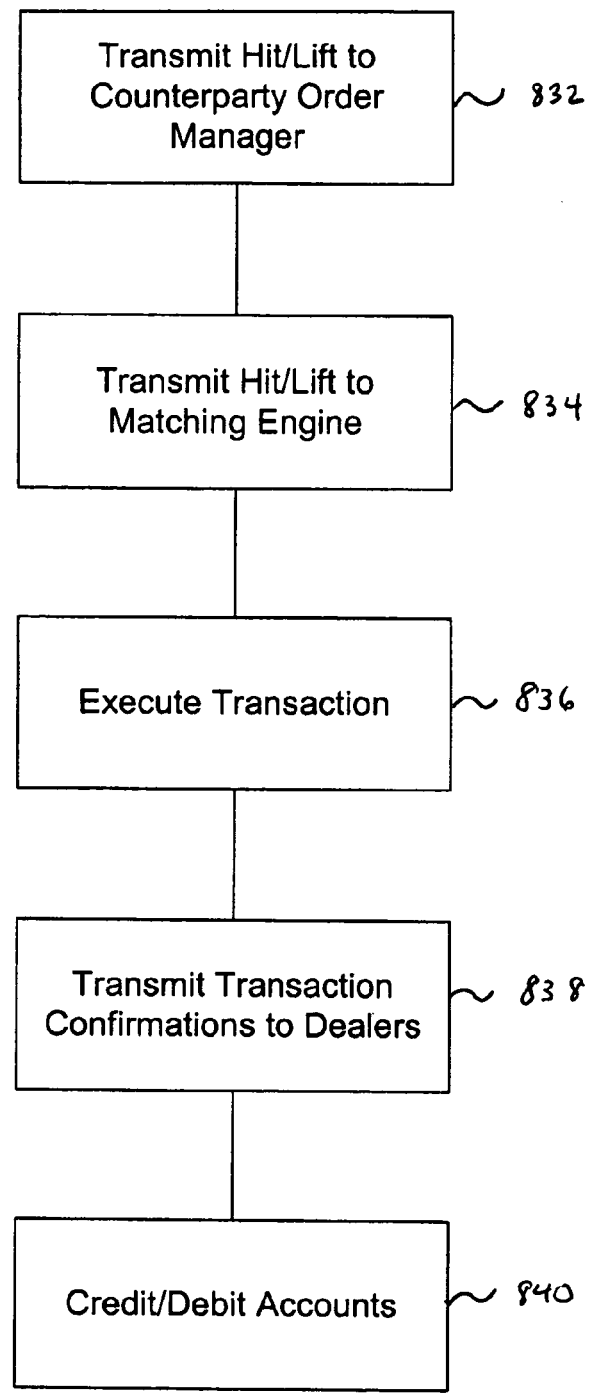
Figure 8E:
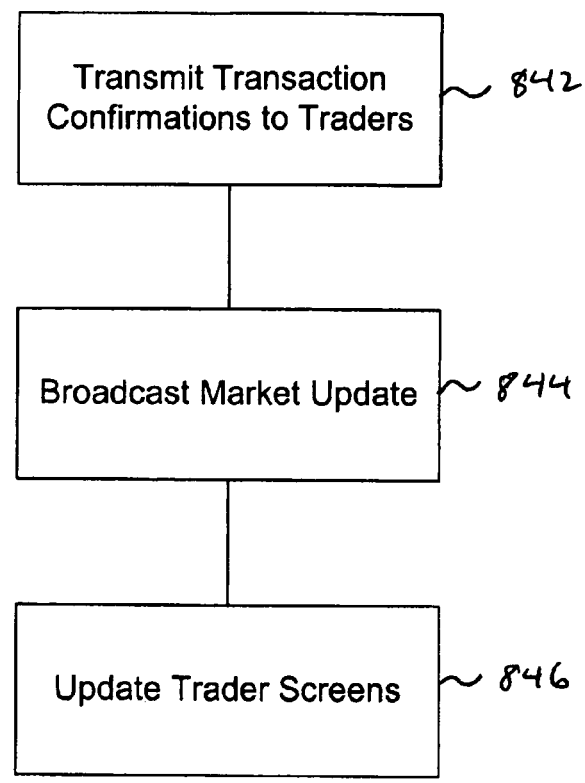

In this preferred embodiment, risk processor 406 is preferably implemented in accordance with the architecture shown in schematic form in FIG. 6. With reference to FIG. 6, there is shown a preferred embodiment of risk processor 406 comprising a secure software environment 602 adapted to securely run an instance of a risk application 604a such that it is not able to communicate directly with any application or device external to secure environment 602. Risk application 604a is preferably a proprietary software application of the dealer that owns risk processor 312 and is adapted to implement the dealer's risk calculation algorithms and generate appropriate price adjustment values to account for risk associated with the potential execution of orders received by the dealer from matching engine 302, as described in more detail below.

Secure environment 602 is also preferably adapted to run a communication application 606 which provides the sole mechanism for transmitting data into or out of the secure environment, a cryptography application 608 adapted to decrypt messages received from matching engine 302, and an order processor application 610 adapted to query risk application 604a for price adjustment values and to generate modified orders that include adjusted pricing based on those price adjustment values for display to traders, as described in more detail below. Risk processor 406 may also preferably run a second version of the dealer's proprietary risk application, shown as 604b in FIG. 6. As described below in connection with FIG. 7, this architecture permits each dealer to run its own risk processing software on its own servers, but to receive as input to that software information identifying the entity that submitted each order without compromising the anonymous character of such multi-lateral trading systems.

In a preferred embodiment, communication application 606, cryptography application 608, and order processor application 610 are provided to each dealer by the entity that operates matching engine 302 via download, such as a secure STP download, or otherwise. Risk application 604a preferably comprises a compiled executable able to be installed using a standard install procedure on commercial operating systems such as MS Windows, Solaris, or Linux. Risk application 604a is also preferably adapted to be uninstalled through the use of a standard uninstall procedure.

In a preferred embodiment, risk application 604a preferably does not comprise any external dependencies that might compromise the secure deployment of the present embodiment. Thus, for example, where risk application 604a requires access to specific software libraries, such libraries are preferably incorporated with the compiled executable comprising risk application 604a, rather than stored on other servers which would require risk application 604a to access them outside of secure environment 602.

In a preferred embodiment, the entity that operates matching engine 302 publishes an application programming interface (API) or software development kit (SDK) that comprises a list of messages that components 606-610 are adapted to generate and receive to facilitate proper inter-communication amongst such components and the dealer's risk application 604a. Each dealer preferably writes to this API or SDK in creating its risk application 604a to ensure proper interfacing between the risk application and components 606-610.

All communications amongst components 606-610 and risk application 604a are preferably made via secure TCP/IP sockets using, e.g., 128-SSL or other appropriate encryption standards to avoid interception of messages within secure environment 602, such as through ciphering by external process probes or other means. In addition, to ensure inter-component message authentication, each component 604a and 606-610 is preferably provided with a valid digital certificate, such as a valid class 3 digital certificate issued by Verisign or other trusted certificate authority, for signing communications with other components within secure environment 602.

A preferred embodiment for conducting trading utilizing the system architecture shown in FIG. 3 and the preferred embodiment of risk processor 406 shown in FIG. 6, will now be described in connection with FIG. 7. Referring to FIG. 7, in step 702, a trader working at a trading terminal 402 of a dealer sub-system 304 enters a base bid or offer to buy or sell a specified financial instrument at a specified price. In step 704, this base order is forwarded by terminal 402 to order manager 404. In step 706, order manager 404 transmits a request to risk processor 406 for a plurality of price-adjustment values to facilitate separate pricing of the order for distinct counterparties based on the specific degree of credit risk associated with transacting with such counterparty. The request preferably comprises all relevant information concerning the order required for any desired credit risk calculations and may, for example, include the instrument, price, and quantity. In step 708, risk application 604b selects an appropriate algorithm for calculating the requested price adjustment values for the entered order. The resulting price adjustment values generated using the algorithm are preferably used to generate an array comprising a plurality of entries, wherein each entry in the array specifies a price adjustment for the order to account for credit risk associated with transacting with one potential counterparty. Illustrative examples of price adjustment arrays are described below in connection with Example 4. As above, risk application 604b of risk processor 406 may be programmed to apply any desired algorithm to calculate the price adjustment values such as the algorithm described above in connection with Example 1.

In step 710, the price adjustment array generated by risk processor 406 is forwarded to order manager 404. In step 712, order manager 404 uses the price adjustment array to generate a family of orders from the entered order, wherein each order in the family is specifically targeted to a potential counterparty and the price of each order is adjusted by the price adjustment quantity specified in the appropriate entry of the price adjustment array associated with that potential counterparty. For ease of description, these orders will be referred to as partial-price-adjusted orders. A particular example illustrating a preferred embodiment for carrying out step 712 is described below in Example 4.

In step 714, order manager 404 transmits the family of partial-price-adjusted orders to matching engine 302. In an alternative preferred embodiment, order manager 404 may be adapted to transmit the trader's base order and the price adjustment array generated by risk processor 406 to matching engine 302, and matching engine 302 may be programmed to generate the family of partial-price-adjusted orders.

In step 716, matching engine 302 encrypts each partial-price-adjusted order in the family of orders. The encrypted orders preferably comprise the identity of the dealer that submitted the order. In step 718, matching engine 302 determines, for each encrypted order in the family of partial-price-adjusted orders, the potential counterparty to which the order relates, and transmits the encrypted order to the order manager of that counterparty. Thus, each dealer sub-system receives a message that includes the submitting party's identity, but is unable to determine the submitting party's identity because of the encryption. The following steps will preferably be performed at each potential counterparty sub-system that receives an order. For ease of discussion, however, the steps will be described with reference to one such sub-system.

Upon receipt of the encrypted order by order manager 404 of the potential counterparty, in step 720, the order manager transmits the partial-price-adjusted order to risk processor 406 where it is directed to communication application 606 which controls access to all other applications within secure environment 602. In step 722, the received partial-price-adjusted order is forwarded to cryptography application 608. In step 724, cryptography application 608 decrypts the order. In step 726, the decrypted order is forwarded to order processor application 610. As noted above, all such inter-component communications within secure environment 602 preferably comprise authenticated communications transmitted via secure TCP/IP sockets.

In step 728, order processor application 610 requests a price adjustment value for the partial-price-adjusted order from risk application 604a. In step 730, risk application 604a selects an appropriate algorithm for calculating a price adjustment for the received partial-price-adjusted order based on the dealer's internal risk policies and risk-calculation methodologies. As above, risk application 604a may be adapted to apply any desired algorithm to calculate the price adjustment value such as the algorithm described above in connection with Example 1.

In step 732, risk application 604a forwards the price adjustment value to order processor application 610. In step 734, order processor application 610 strips the submitting party identifier from the received order and modifies the order price in accordance with the price adjustment value to generate a price-adjusted order. A particular example illustrating a preferred embodiment for carrying out step 738 is described below in Example 4. In step 736, order processor application 610 forwards the price-adjusted order to communication application 606. In step 738, communication application 606 transmits the price-adjusted order without an identifier for the submitting party to order manager 404. In step 740, order manager 404 transmits the price-adjusted order to terminals 402 for display to the potential counterparty's traders.

In step 742, a counterparty trader determines that he or she wishes to execute against the displayed price-adjusted_order and enters a command to do so (e.g., a hit or a lift command). In step 744, this hit or lift command is transmitted to order manager 404. In step 746, order manager 404 transmits the hit or lift to matching engine 406. In step 748, matching engine 302 executes the transaction.

In step 750, matching engine 302 transmits transaction confirmation messages to both transacting parties. In step 752, order managers 404 of the transacting dealers credit their respective risk adjustment portion of the execution price, which may be obtained from risk processor 406, to an internal risk allocation account and perform any other internal accounting necessary to reflect the transaction. Crediting of dealer risk allocation accounts may preferably be performed in a manner analogous to that described above in Example 3. In step 754, order managers 404 of the transacting dealers transmit transaction confirmation messages to the trader terminals 402 of the transacting traders. In step 756, matching engine 302 broadcasts a market update message to all market participants to inform the market of the transaction. In step 758, the screens of all traders are updated to reflect the new state of the market resulting from the hit or lift.

Operation of this preferred embodiment of the present invention will now be further described in connection with a particular example.

Example 4

For purposes of the present example, it will be assumed that a trader at a first dealer, Dealer A, enters a base bid for 10M at 4.970%. For ease of description, it will be assumed for purposes of the present example that the price adjustment values generated by risk application 604b for this order are the same as the values generated by risk processor 406 of Dealer A described above in Example 3.

Assuming these values, order manager 404 of Dealer A will generate the following family of partial-price-adjusted orders from the trader's base bid:

| Family of Orders Generated by Dealer A | | | |
| --- | --- | --- | --- |
| Potential Counterparty | Order Type | Quantity | Price |
| Dealer B | Bid | 10 | 4.968 |
| Dealer C | Bid | 10 | 4.968 |
| Dealer D | Bid | 10 | 4.970 |
| Dealer E | Bid | 10 | 4.968 |

More specifically, for each partial-price-adjusted order generated in the family of orders, order manager 404 of Dealer A subtracts the price adjustment value determined by risk processor 406 from the trader's order price to generate the modified order price. The conceptual explanation for this aspect of the process is the same as that described above in connection with Example 3.

Order manager 404 transmits the family of partial-price-adjusted orders to matching engine 302. Matching engine 302 encrypts the partial-price-adjusted orders (including an identifier of the submitting party) and transmits the appropriate encrypted order to each of Dealers B-E.

Order manager 404 of each potential counterparty transmits the encrypted partial-price-adjusted order to its risk processor 406 where it is decrypted and a price adjustment value for the order generated by risk application 604a within secure environment 602. For purposes of the present example, it will be assumed that the price adjustment values generated by risk applications 604a of Dealers B-E are the same as those described above for Dealers B-E in Example 3.

Order processor application 610 at each respective potential counterparty creates a price-adjusted order from the partial-price-adjusted order that does not identify Dealer A and includes a modified price calculated by subtracting the price adjustment amount determined by risk application 604a from the price specified in the received order. The conceptual explanation for this aspect of the process is the same as described above in connection with Example 3. Thus, the pricing for the bid presented to traders at the different dealers will be as follows:

| Potential Counterparty | Price |
| --- | --- |
| Dealer A | 4.970 |
| Dealer B | 4.967 |
| Dealer C | 4.966 |
| Dealer D | 4.970 |
| Dealer E | 4.965 |

The display screens of all traders are updated to reflect the bid. As will be recognized, such screens will look the same in this example as the screens shown above in Example 3 after processing of Dealer A's bid.

It will now be further assumed that a trader at Dealer B enters a base offer to sell 20M at 5.030%. For ease of description, it will be assumed for purposes of the present example that the price adjustment values generated by risk application 604a for this base order is the same as the values generated by risk processor 406 of Dealer B described above in Example 3.

Assuming these values, order manager 404 of Dealer B will generate the following family of partial-price-adjusted orders from the trader's bid:

| Family of Orders Generated by Dealer B | | | |
| --- | --- | --- | --- |
| Potential Counterparty | Order Type | Quantity | Price |
| Dealer A | Offer | 20 | 5.031 |
| Dealer C | Offer | 20 | 5.032 |
| Dealer D | Offer | 20 | 5.031 |
| Dealer E | Offer | 20 | 5.033 |

More specifically, for each partial-price-adjusted order generated in the family of orders, order manager 404 of Dealer B adds the price adjustment value determined by risk processor 406 to the trader's order price to generate the modified order price. The conceptual explanation for this aspect of the process is the same as that described above in connection with Example 3.

Order manager 404 transmits the family of partial-price-adjusted orders to matching engine 302. Matching engine 302 encrypts the partial-price-adjusted orders (including an identifier of the submitting party) and transmits the appropriate encrypted partial-price-adjusted order to each of Dealer A and Dealers C-E.

Order manager 404 of each potential counterparty transmits the encrypted partial-price-adjusted order to its risk processor 406 where a price adjustment value for the order is generated by risk application 604a within secure environment 602. For ease of description, it will be assumed for purposes of the present example that the price adjustment values generated by risk applications 604a of Dealer A and Dealers C-E are the same as those described above for those dealers in Example 3.

Order processor application 610 at each respective potential counterparty then creates a price-adjusted order from the partial-price-adjusted order that does not identify Dealer B and includes a modified price calculated by adding the price adjustment amount determined by risk application 604a to the price specified in the received partial-price-adjusted order. The conceptual explanation for this aspect of the process is the same as described above in connection with Example 3. Thus, the pricing for the offer presented to traders at the different dealers will be as follows:

| Potential Counterparty | Price |
| --- | --- |
| Dealer A | 5.033 |
| Dealer B | 5.030 |
| Dealer C | 5.033 |
| Dealer D | 5.032 |
| Dealer E | 5.035 |

The display screens of all traders are updated to reflect the offer. As will be recognized, such screens will look the same in this example as the screens shown above in Example 3 after processing of Dealer B's offer.

Another preferred embodiment for implementing the present invention to provide an exchange trading model will now be described in connection with FIG. 8. This preferred embodiment may preferably utilize largely the same architecture and components shown in FIG. 3; however, as will be understood from the following description and example, the design and operation of those components will differ to some degree in this preferred embodiment.

A preferred embodiment for conducting exchange trading utilizing the system architecture shown in FIG. 3 will now be described in connection with FIG. 8. Referring to FIG. 8, in step 802, a trader working at a trading terminal 402 of a dealer sub-system 304 enters a base bid or offer to buy or sell a specified financial instrument at a specified price. In step 804, this base order is forwarded by terminal 402 to order manager 404. In step 806, order manager 404 transmits a request to risk processor 406 for a plurality of price-adjustment values to facilitate separate pricing of the order for one or more classes of counterparties based on the specific degree of credit risk associated with transacting with such classes of counterparties. The request preferably comprises all relevant information concerning the order required for any desired credit risk calculations and may, for example, include the instrument, price, and quantity. In step 808, risk processor 406 selects an appropriate algorithm for calculating the requested price adjustment values for the entered order. The resulting price adjustment values generated using the algorithm are preferably used to generate an array comprising a plurality of entries, wherein each entry in the array specifies a price adjustment for the order to account for credit risk associated with transacting with a class of counterparties. Illustrative examples of price adjustment arrays are described below in connection with Example 5. As above, risk processor 406 may be programmed to apply any desired algorithm to calculate the price adjustment such as the algorithm described above in connection with Example 1.

In step 810, the price adjustment array generated by risk processor 406 is forwarded to order manager 404. In step 812, order manager 404 uses the price adjustment array to generate a family of partial-price-adjusted orders from the base order, wherein each order in the family is specifically targeted to a class of potential counterparties and the price of each order is adjusted by the price adjustment quantity specified in the appropriate entry of the price adjustment array associated with that class of potential counterparties. A particular example illustrating a preferred embodiment for carrying out step 812 is described below in Example 5.

In step 814, order manager 404 transmits the family of partial-price-adjusted orders to matching engine 302. In an alternative preferred embodiment, order manager 404 may be adapted to transmit the trader's order and the price adjustment array generated by risk processor 406 to matching engine 302, and matching engine 302 may be programmed to generate the family of partial-price-adjusted orders.

In step 816, matching engine 302 determines, for each potential counterparty, the class to which the counterparty belongs by consulting a lookup table. The lookup table may, in some embodiments, classify dealers using criteria on a system wide basis (e.g., assets, primary dealer status, or credit rating as in Example 1 above). Alternatively, in other embodiments, any dealer wishing to do so may periodically submit to matching engine 302 a lookup table to be used in processing orders received from or transmitted to the dealer. A particular example illustrating a preferred embodiment for carrying out step 816 is described below in Example 5.

In step 818, matching engine 302 determines, for each order in the family of partial-price-adjusted orders, the potential counterparty or counterparties to which the order relates based on the counterparty's class designation and transmits the order to the order manager of that counterparty or those counterparties. In a preferred embodiment, matching engine 302 transmits with the order a classification parameter that specifies the class of institution to which the dealer entity that submitted the order belongs, without revealing the identity of that trading entity. This class designation, too, may be derived in some embodiments from a system wide table that classifies dealers based on objective criteria or may be derived in other embodiments from a table submitted by the counterparty for use in processing orders input by or transmitted to that counterparty. Thus, in this preferred embodiment of the present invention, substantial information regarding the trading entity that submitted the order is provided to the potential counterparty so that the counterparty may perform its own risk-based price-adjustment calculations, without compromising the anonymity preferred in multi-lateral trading systems. The following steps will preferably be performed at each potential counterparty sub-system that receives an order. For ease of discussion, however, the steps will be described with reference to one such sub-system.

Upon receipt of the partial-price-adjusted order by order manager 404 of the potential counterparty, in step 820, the order manager transmits a request to risk processor 406 for a price adjustment value for the order. The request preferably comprises all relevant information concerning the order required for any desired risk calculations and may, for example, include the instrument, price, quantity, and classification of the dealer that submitted the order. In step 822, risk processor 406 selects an appropriate algorithm for calculating a price adjustment for the received order based on the counterparty's internal risk policies and risk-calculation methodologies. As above, risk processor 406 may be programmed to apply any desired algorithm to calculate the price adjustment value.

In step 824, risk processor 406 transmits the price adjustment value to order manager 404. In step 826, order manager 404 modifies the order price in accordance with the price adjustment value to create a price-adjusted order. In step 828, order manager 404 transmits the price-adjusted order to terminals 402 for display to the potential counterparty's traders.

In step 830, a counterparty trader determines that he or she wishes to execute against the displayed price-adjusted order and enters a command to do so (e.g., a hit or a lift command). In step 832, this hit or lift command is transmitted to order manager 404. In step 834, order manager 404 transmits the hit or lift to matching engine 302 which, in step 836, executes the transaction.

In step 838, matching engine 302 transmits transaction confirmation messages to both transacting parties. In step 840, order managers 404 of the transacting dealers credit their respective risk adjustment portion of the execution price to an internal risk allocation account and perform any other internal accounting necessary to reflect the transaction. Crediting of dealer risk allocation accounts may preferably be performed in a manner analogous to that described above in Example 3. In step 842, order managers 404 of the transacting dealers transmit transaction confirmation messages to the trader terminals of the transacting traders. In step 844, matching engine 302 broadcasts a market update message to all market participants to inform the market of the transaction. In step 846, the screens of all traders are updated to reflect the new state of the market resulting from the hit or lift.

Operation of this preferred embodiment of the present invention will now be further described in connection with a specific particular example.

Example 5

For purposes of the present example, it will be assumed that a trader at a first dealer, Dealer A, enters a base bid for 10M at 4.970%. It will further be assumed that risk processor 406 of Dealer A calculates the following price adjustment array for this bid:

| Dealer Class | Price Adjustment |
| --- | --- |
| 1 | 0.000 |
| 2 | 0.001 |
| 3 | 0.003 |

Assuming these values, order manager 404 of Dealer A will generate the following family of partial-price-adjusted orders from the trader's bid:

| Dealer Class | Order Type | Quantity | Price |
| --- | --- | --- | --- |
| 1 | Bid | 10 | 4.970 |
| 2 | Bid | 10 | 4.969 |
| 3 | Bid | 10 | 4.967 |

More specifically, for each modified order generated in the family of partial-price-adjusted orders, order manager 404 of Dealer A subtracts the price adjustment value determined by risk processor 406 from the trader's order price to generate the modified order price. The conceptual explanation for this aspect of the process is the same as that described above in connection with Example 3.

Order manager 404 transmits the family of partial-price-adjusted orders to matching engine 302 which identifies the target dealers for each order in the family based on their class and transmits the orders to them. With the transmitted orders, matching engine 302 transmits a class identifier that identifies the class to which Dealer A belongs.

Matching engine 302 may be provided with lookup tables analogous to those described above in connection with the RFQ embodiment for determining a class or "rating band" to which a particular potential counterparty should be assigned. For ease of description, however, it will be assumed in the present example that matching engine 302 maintains the somewhat simpler tables described below.

For purposes of the present example, it will be assumed that matching engine 302 maintains two classification lookup tables: (1) a first lookup table that classifies each dealer based on objective characteristics and is adopted for use by Dealers B-E; and (2) a second lookup table submitted by Dealer A which wishes to utilize its own proprietary classification scheme. It will be further assumed that the first lookup table is as follows:

| Lookup Table 1 | |
| --- | --- |
| Potential Counterparty | Class |
| Dealer A | 1 |
| Dealer B | 1 |
| Dealer C | 3 |
| Dealer D | 2 |
| Dealer E | 2 |

It will further be assumed that lookup table 2 is as follows:

| Lookup Table 2 | |
| --- | --- |
| Potential Counterparty | Class |
| Dealer B | 2 |
| Dealer C | 3 |
| Dealer D | 1 |
| Dealer E | 2 |

Thus, for example, matching engine will transmit to Dealer B an order priced at 4.969 (since Dealer B is a class 2 dealer in lookup table 2) and specifying the submitting dealer as a class 1 dealer (since Dealer A is a class 1 dealer on lookup table 1). Applying this principle to all potential counterparties, matching engine 302 will transmit the following partial-price-adjusted orders to the potential counterparty dealers:

| To | Order Type | Quantity | Price | Submitting Dealer Class |
| --- | --- | --- | --- | --- |
| Dealer B | Bid | 10 | 4.969 | 1 |
| Dealer C | Bid | 10 | 4.967 | 1 |
| Dealer D | Bid | 10 | 4.970 | 1 |
| Dealer E | Bid | 10 | 4.969 | 1 |

Upon receipt of these orders, each order manager 404 at a potential counterparty will request a price adjustment value for the order from its risk processor. It will be assumed for purposes of the present example that the price adjustment values determined by the potential counterparties are as follows:

| Dealer Class | Price Adjustment |
| --- | --- |
| Dealer B | |
| 1 | 0.000 |
| 2 | 0.001 |
| 3 | 0.003 |
| Dealer C | |
| 1 | 0.001 |
| 2 | 0.002 |
| 3 | 0.003 |
| Dealer D | |
| 1 | 0.000 |
| 2 | 0.001 |
| 3 | 0.001 |
| Dealer E | |
| 1 | 0.000 |
| 2 | 0.002 |
| 3 | 0.002 |

Assuming these price adjustment values, the order managers 404 of the potential counterparties will derive the following price-adjusted orders for presentation to their respective traders:

| Potential Counterparty | Order Type | Quantity | Price |
| --- | --- | --- | --- |
| Dealer B | Bid | 10 | 4.969 |
| Dealer C | Bid | 10 | 4.966 |
| Dealer D | Bid | 10 | 4.970 |
| Dealer E | Bid | 10 | 4.969 |

More specifically, each order manager 404 of a potential counterparty subtracts the price adjustment value determined by its risk processor 406 from the received partial-price-adjusted order price to generate the modified order price that it presents to its traders. The conceptual explanation for this aspect of the process is the same as that described above in connection with Example 3.

At this point in the present example, the screens of Dealers A-E would appear as follows:

| Bid | | Offer | |
| --- | --- | --- | --- |
| Quantity | Price | Price | Quantity |
| Dealer A Screen | | | |
| 10 | 4.970* | | |
| *Indicates own bid. | | | |
| Dealer B Screen | | | |
| 10 | 4.969 | | |
| *Indicates own offer. | | | |
| Dealer C Screen | | | |
| 10 | 4.966 | | |
| Dealer D Screen | | | |
| 10 | 4.970 | | |

| Bid | | Offer | |
|---|---|---|---|
| Quantity | Price | Price | Quantity |
| Dealer E Screen | | | |
| 10 | 4.969 | | |

For purposes of the present example, it will be further assumed that a trader at Dealer B now enters a base offer to sell 20M at 5.030%. It will further be assumed that risk processor 406 of Dealer B calculates the following price adjustment array for this offer:

| Dealer Class | Price Adjustment |
|---|---|
| 1 | 0.000 |
| 2 | 0.002 |
| 3 | 0.003 |

Assuming these values, order manager 404 of Dealer B will generate the following family of partial-price-adjusted orders from the trader's offer:

| Dealer Class | Order Type | Quantity | Price |
|---|---|---|---|
| 1 | Offer | 20 | 5.030 |
| 2 | Offer | 20 | 5.032 |
| 3 | Offer | 20 | 5.033 |

More specifically, for each modified order generated in the family of partial-price-adjusted orders, order manager 404 of Dealer B adds the price adjustment value determined by risk processor 406 to the trader's order price to generate the modified order price. The conceptual explanation for this aspect of the process is the same as that described above in connection with Example 3.

Order manager 404 transmits the family of partial-price-adjusted orders to matching engine 302 which identifies the target dealers for each order in the family based on their class and transmits the orders to them. With the transmitted orders, matching engine 302 transmits a class identifier that identifies the class to which Dealer B belongs.

For ease of description, it will be assumed for purposes of the present example that matching engine 302 maintains the same two lookup tables described above in connection with processing of Dealer A's bid, i.e.:

| Lookup Table 1 (For Use W/R/T Dealers B-E) | |
|---|---|
| Potential Counterparty | Class |
| Dealer A | 1 |
| Dealer B | 1 |
| Dealer C | 3 |
| Dealer D | 2 |
| Dealer E | 2 |

| Lookup Table 2 (For Use W/R/T Dealer A) | |
|---|---|
| Potential Counterparty | Class |
| Dealer B | 2 |
| Dealer C | 3 |
| Dealer D | 1 |
| Dealer E | 2 |

Thus, for example, matching engine will transmit to Dealer A an order priced at 5.030 (since Dealer A is a class 1 dealer in lookup table 1) and specifying the submitting dealer as a class 2 dealer (since Dealer B is a class 2 dealer on lookup table 2). Applying this principle to all potential counterparties, matching engine 302 will transmit the following partial-price-adjusted orders to the potential counterparty dealers:

| To | Order Type | Quantity | Price | Submitting Dealer Class |
|---|---|---|---|---|
| Dealer A | Offer | 20 | 5.030 | 2 |
| Dealer C | Offer | 20 | 5.033 | 1 |
| Dealer D | Offer | 20 | 5.032 | 1 |
| Dealer E | Offer | 20 | 5.032 | 1 |

Upon receipt of these orders, each order manager 404 at a potential counterparty will request a price adjustment value for the order from its risk processor. It will be assumed for purposes of the present example that the price adjustment values determined by the potential counterparties are as follows:

| Dealer Class | Price Adjustment |
|---|---|
| Dealer A | |
| 1 | 0.000 |
| 2 | 0.000 |
| 3 | 0.002 |
| Dealer C | |
| 1 | 0.001 |
| 2 | 0.002 |
| 3 | 0.003 |
| Dealer D | |
| 1 | 0.000 |
| 2 | 0.001 |
| 3 | 0.001 |
| Dealer E | |
| 1 | 0.000 |
| 2 | 0.002 |
| 3 | 0.002 |

Assuming these price adjustment values, the order managers 404 of the potential counterparties will derive the following price-adjusted orders for presentation to their respective traders:

| Potential Counterparty | Order Type | Quantity | Price |
|---|---|---|---|
| Dealer A | Offer | 20 | 5.030 |
| Dealer C | Offer | 20 | 5.034 |
| Dealer D | Offer | 20 | 5.032 |
| Dealer E | Offer | 20 | 5.032 |

More specifically, each order manager 404 of a potential counterparty adds the price adjustment value determined by its risk processor 406 to the received order price to generate the modified order price that it presents to its traders. The conceptual explanation for this aspect of the process is the same as that described above in connection with Example 3.

At this point in the present example, the screens of Dealers A-E would appear as follows:

| | Bid | Offer | |
|---|---|---|---|
| Quantity | Price | Price | Quantity |
| Dealer A Screen | | | |
| 10 | 4.970* | 5.030 | 20 |
| *Indicates own bid. | | | |
| Dealer B Screen | | | |
| 10 | 4.969 | 5.030* | 20 |
| *Indicates own offer. | | | |
| Dealer C Screen | | | |
| 10 | 4.966 | 5.034 | 20 |
| Dealer D Screen | | | |
| 10 | 4.970 | 5.032 | 20 |
| Dealer E Screen | | | |
| 10 | 4.969 | 5.032 | 20 |

While the invention has been described in conjunction with specific embodiments, it is evident that numerous alternatives, modifications, and variations will be apparent to those skilled in the art in light of the foregoing description.

What is claimed is:

1. A request for quote system for buying and selling swap-based financial instruments, having extended maturity periods, the system comprising:
   an order management server that:
      receives a request for quote for a swap-based financial instrument from a first entity;
      provides the request for quote to a second entity;
      receives a base price for responding to the request for quote;
      generates a response to the request for quote, the response to the request for quote comprising a response price determined from the base price and a price adjustment value; and
      provides the response to the request for quote to the first entity; and
   a risk processor that determines the price adjustment value by which the base price should be modified to account for risk to the second entity associated with a potential transaction of the swap-based financial instrument, the risk accounting for the potential for default over the extended maturity of the swap-based financial instrument.

2. A method for the electronic buying and selling of swap-based financial instruments, having extended maturity periods, comprising:
   receiving, at an order management server, a request for quote from a first entity;
   providing, by the order management server, the request for quote to a second entity;
   receiving, by the order management server, a base price for responding to the request for quote;
   determining, by a risk processor, a price adjustment value by which the base price should be modified to account for risk to the second entity associated with a potential transaction of a swap-based financial instrument, the risk accounting for the potential for default over the extended maturity of the swap-based financial instrument;
   generating, by the order management server, a response to the request for quote, the response to the request for quote comprising a response price determined from the base price and the price adjustment value; and
   providing, by the order management server, the response to the request for quote to the first entity.

3. The method of claim 2, wherein the base price is determined by a trader of the second entity.

4. The method of claim 2, wherein price adjustment value is determined in accordance with risk algorithms specified by the second entity.

5. The method of claim 2, wherein the price adjustment value is determined by:
   integrating the area under an expected loan balance curve to determine the size of the risk to the second entity for an interest rate swap;
   multiplying the amount determined by said integration by a desired credit premium to determine an amount to account for risk associated with the potential transaction; and
   spreading the amount over the total size of financial instrument to determine an equivalent number of basis points by which the interest rate swap price should be adjusted to account for risk associated with the potential transaction.

6. The method of claim 5, wherein the financial instrument is an interest rate swap.

7. The method of claim 5, wherein the financial instrument is a currency swap.

8. The method of claim 5, wherein the financial instrument is a commodity swap.

9. The method of claim 5, wherein the financial instrument is a energy swap.

10. The system of claim 1, wherein the risk processor determines the price adjustment value taking account of the price and/or instrument.

11. The system of claim 1, wherein the order management server is further configured to:
   receive an order at a transaction price and determine if the order is valid;
   separate the transaction price of a valid order into a component attributable to the base price and a credit risk component attributable to account for the credit risk associated with the transaction; and
   credit the credit risk component to a risk allocation account.

12. The method according to claim 2, wherein determining the price adjustment value takes account of the price and/or financial instrument.

13. The method according to claim 2, further comprising:
   receiving, by the order management server, an order at a transaction price and determining if the order is valid;
   separating, by the order management server, the transaction price of a valid order into a credit risk component attributable to the base price and a component attributable to account for the credit associated with the transaction; and
   crediting the credit risk component to a risk allocation account.

* * * * *